Sept. 7, 1954　　W. H. BURGER ET AL　　2,688,163
METHOD AND APPARATUS FOR MAKING TAMPONS Filed April 16, 1948　　14 Sheets-Sheet 3

Inventors:
William H. Burger
Howard A. Collins and
Howard M. Ruth

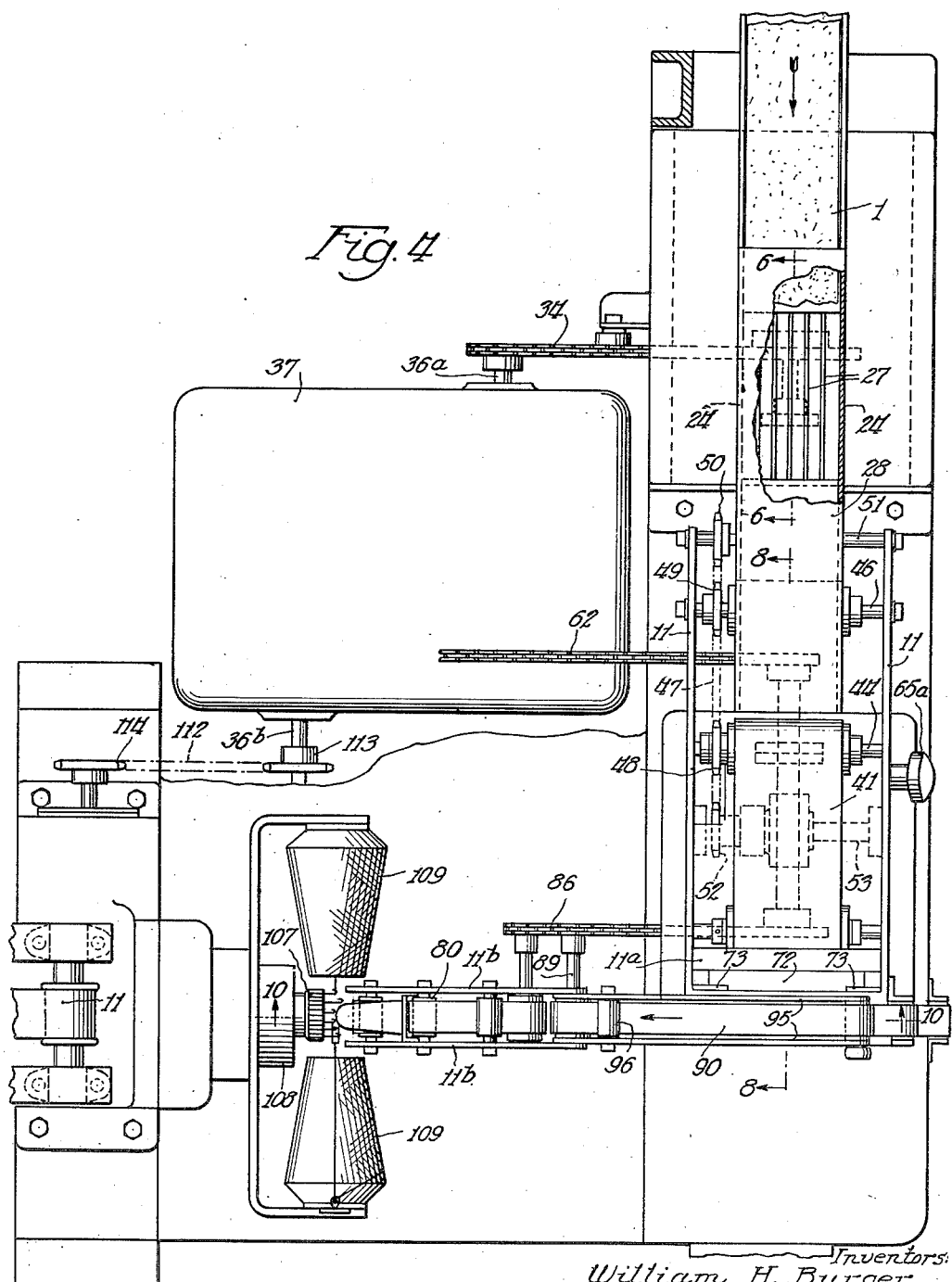

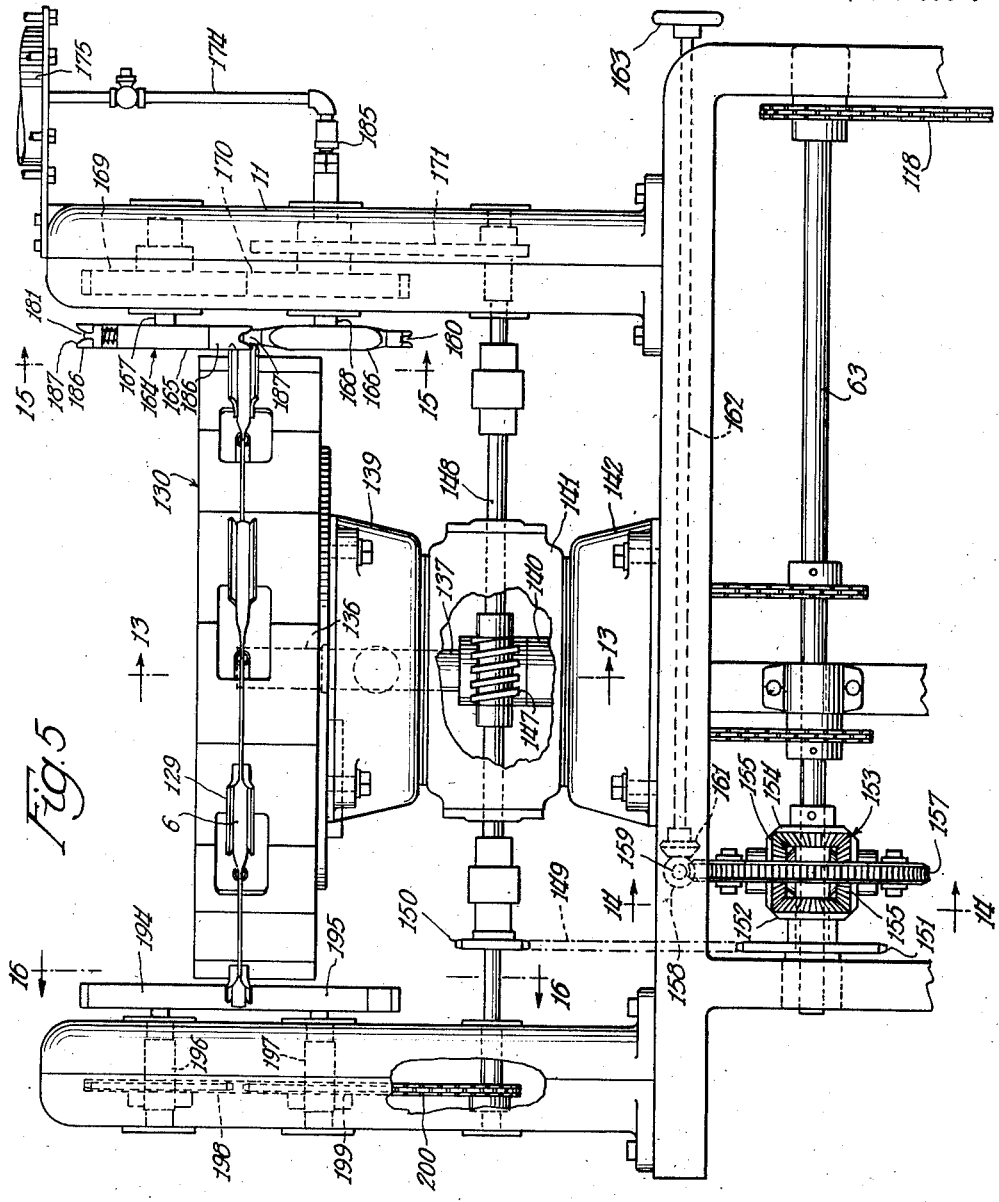

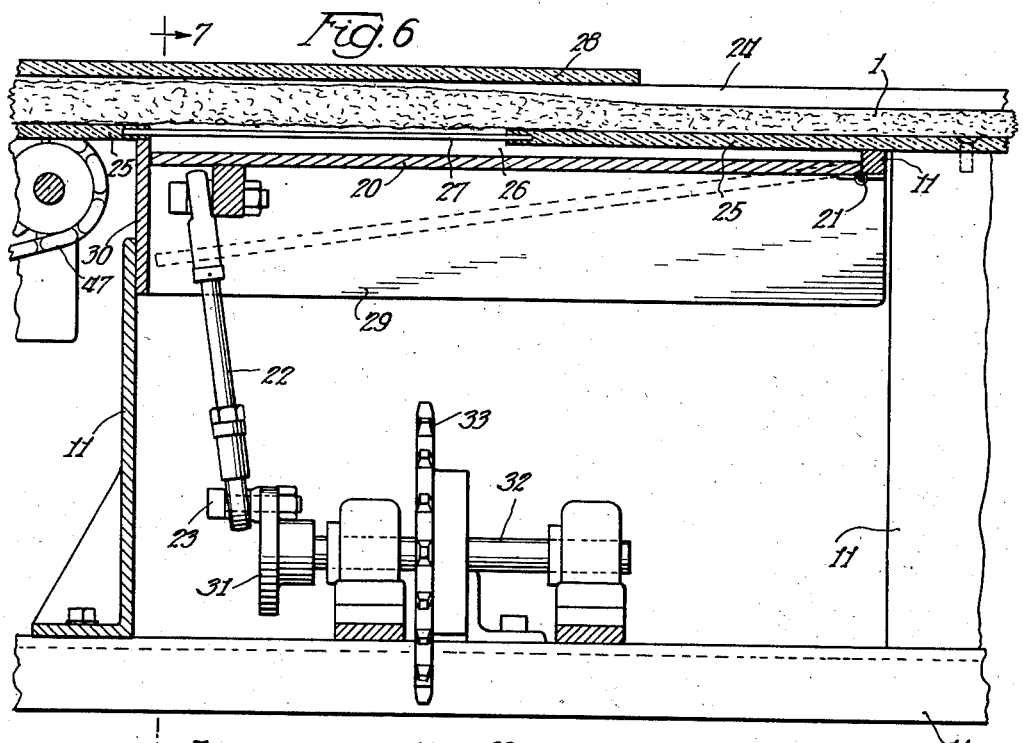
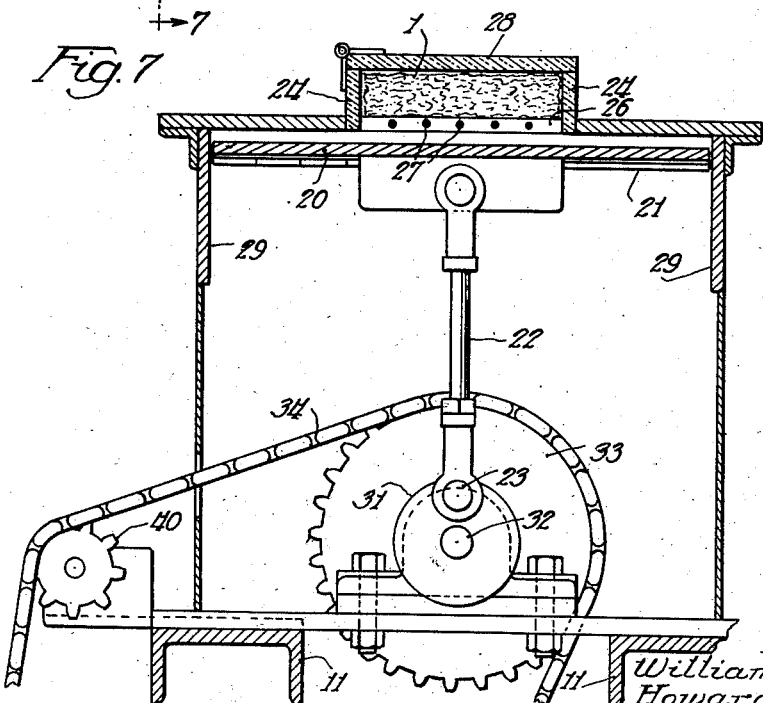

Inventors:
William H. Burger
Howard A. Collins and
Howard M. Ruth
By: Soans, Pond & Anderson
Attys.

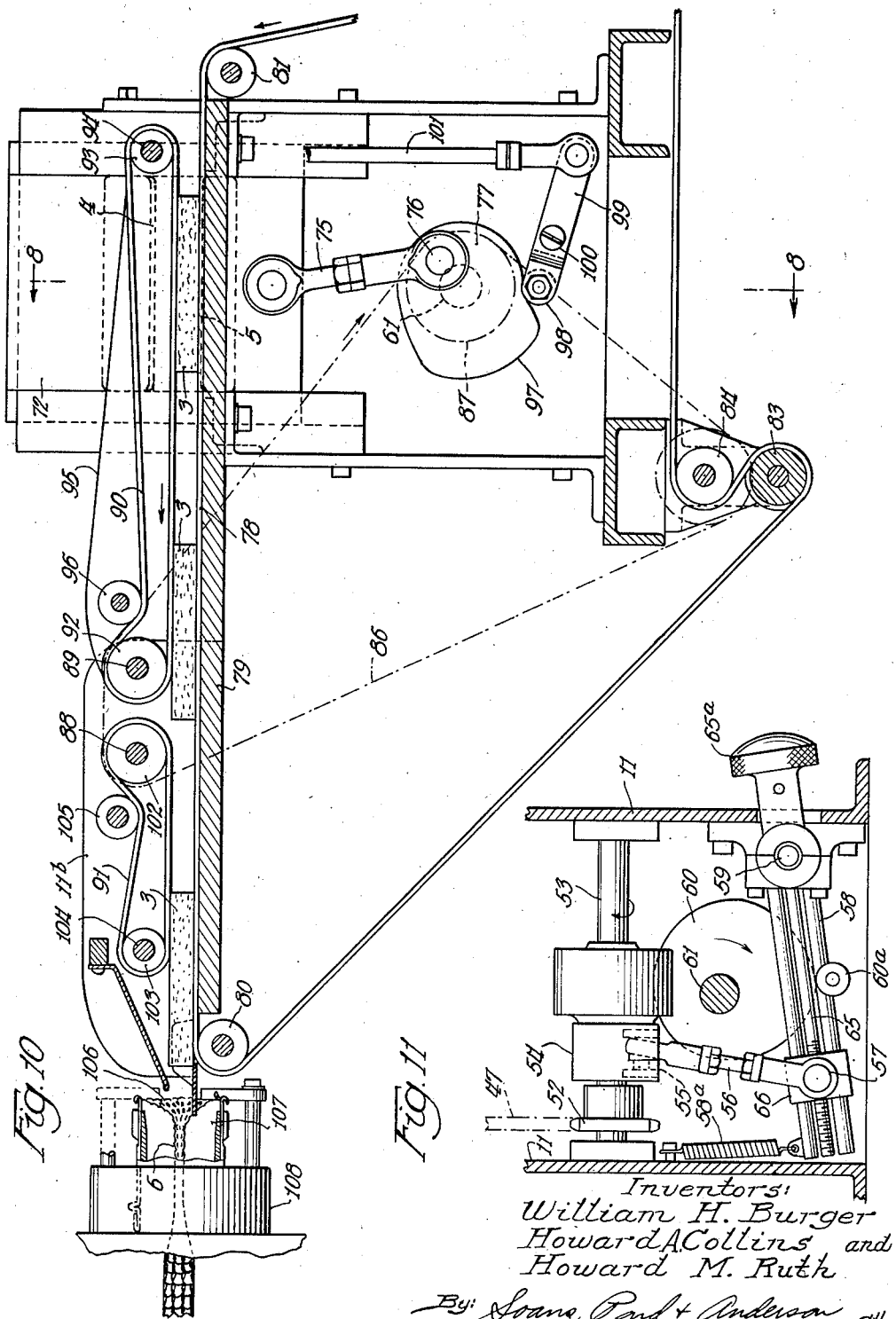

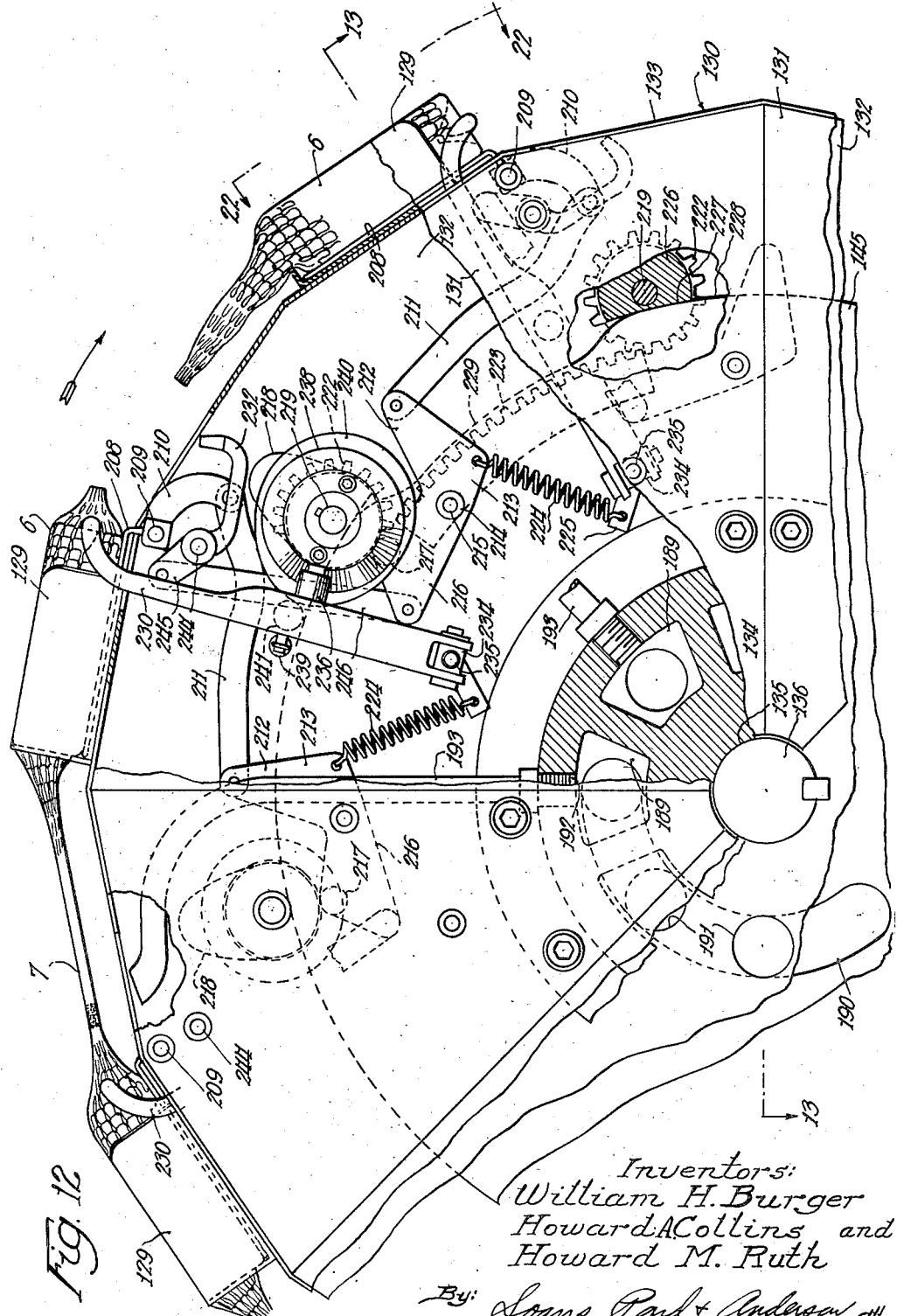

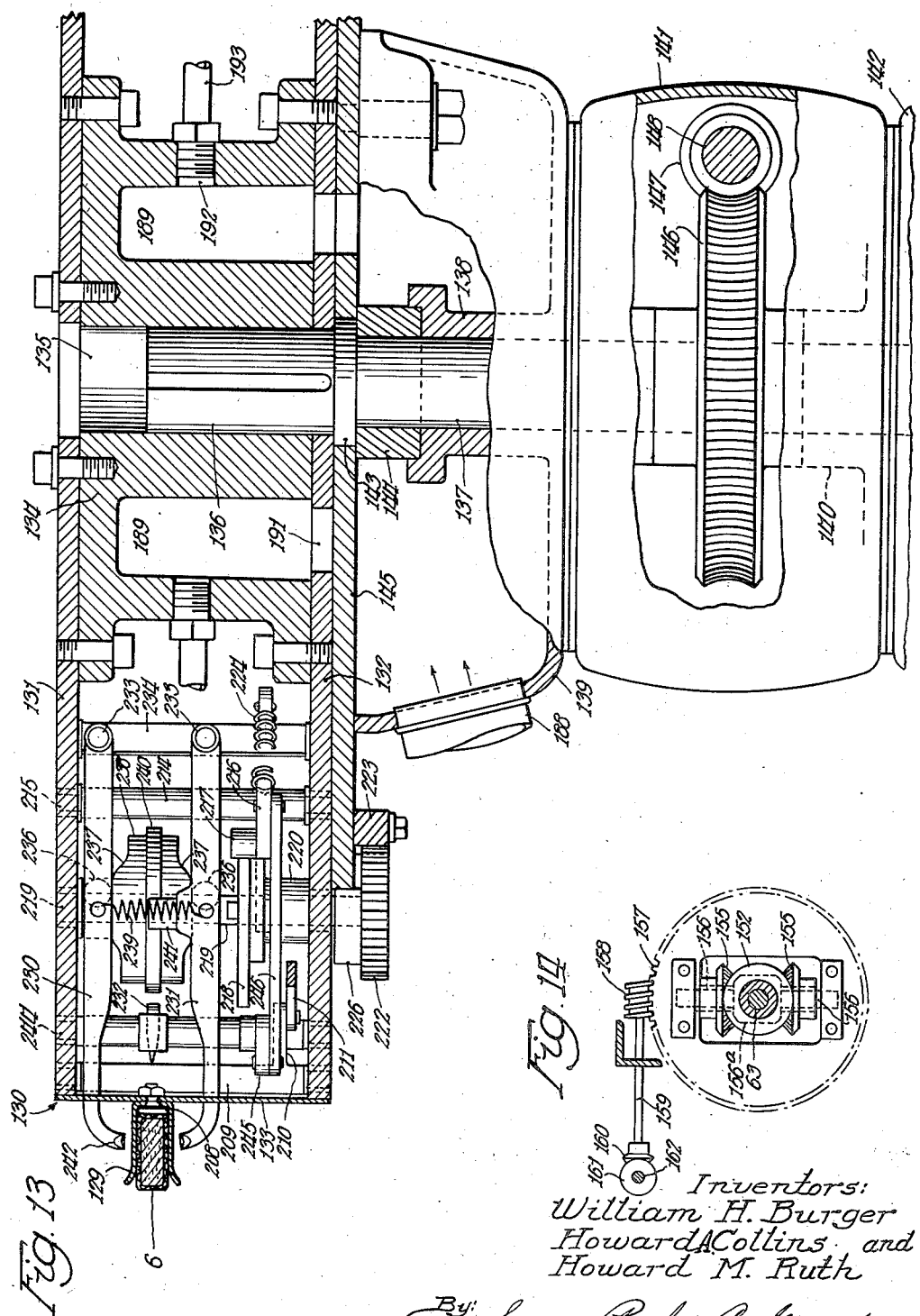

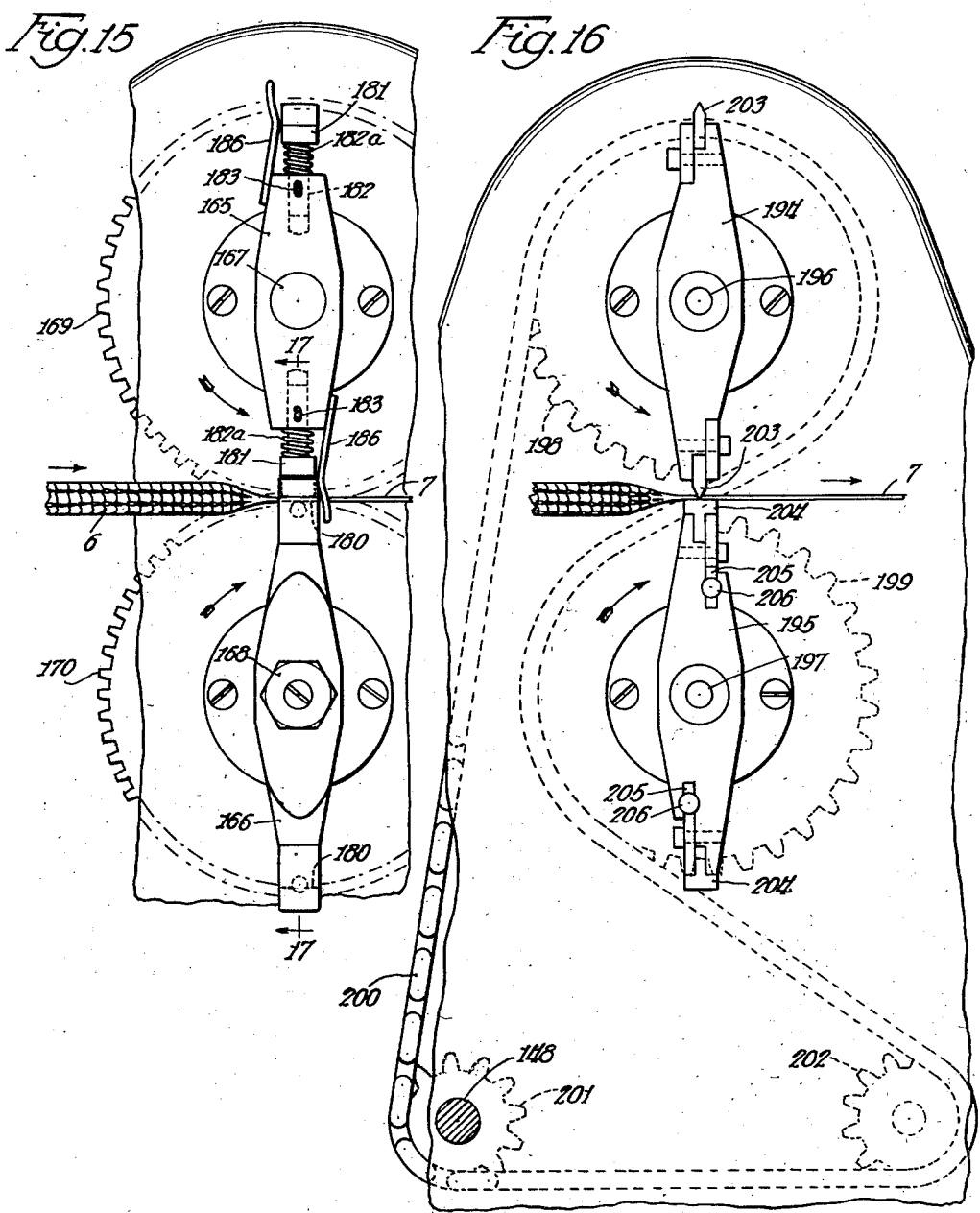

Sept. 7, 1954    W. H. BURGER ET AL    2,688,163
METHOD AND APPARATUS FOR MAKING TAMPONS
Filed April 16, 1948    14 Sheets-Sheet 12
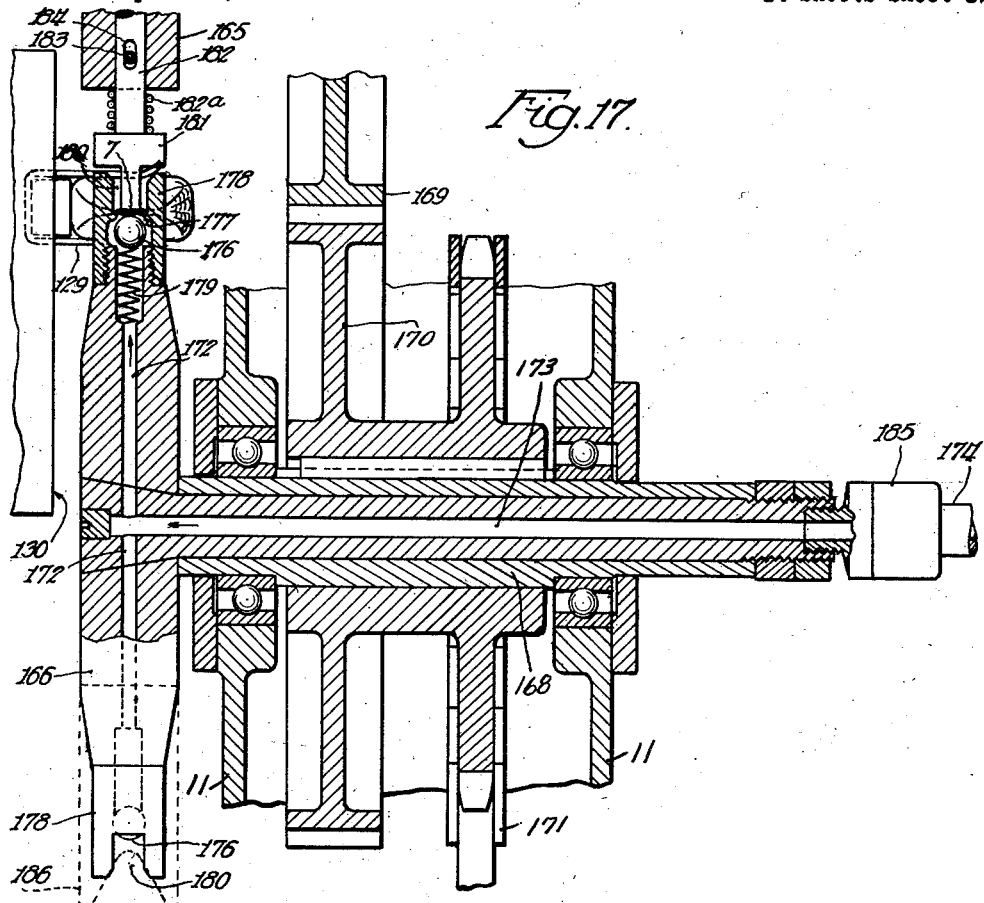
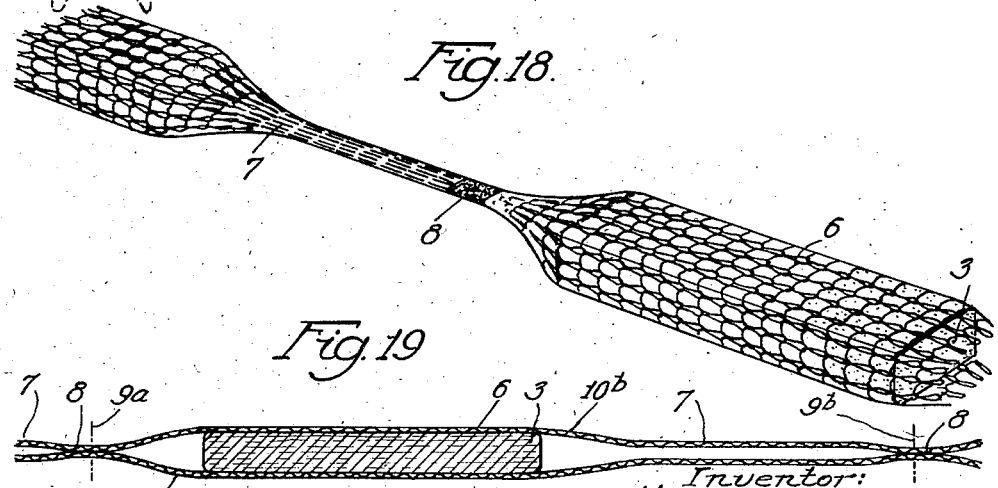
Inventor:
William H. Burger
Howard A. Collins and
Howard M. Ruth
By: Soans, Pond + Anderson Attys

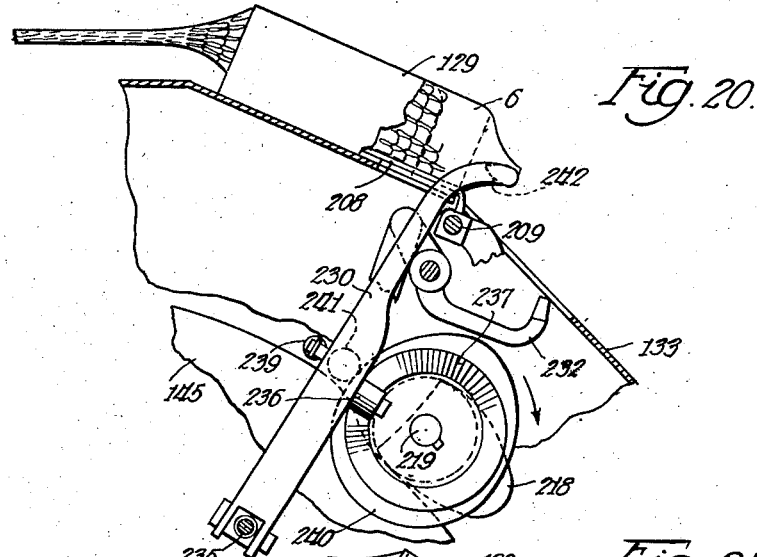

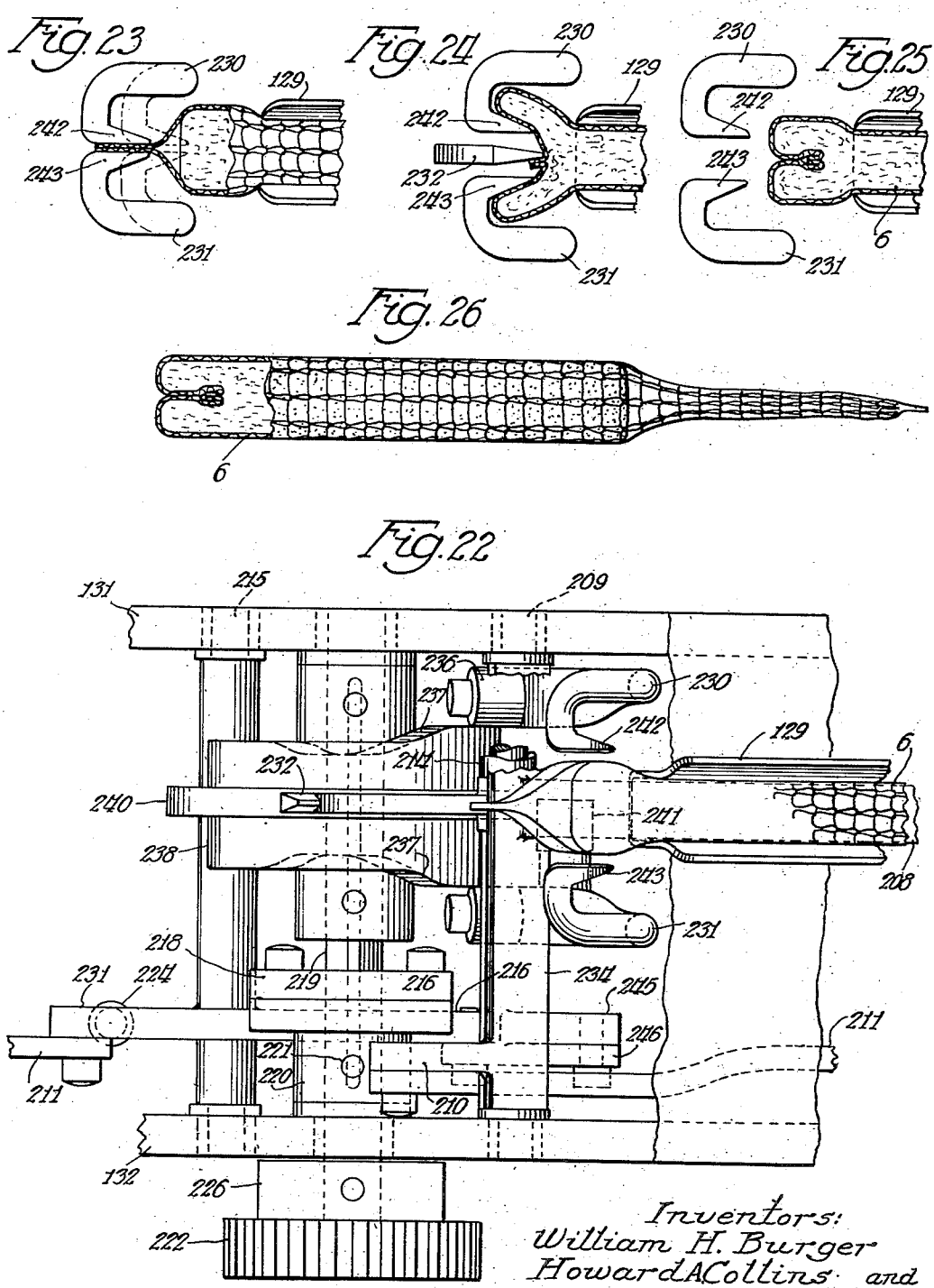

Patented Sept. 7, 1954

2,688,163

UNITED STATES PATENT OFFICE 2,688,163

METHOD AND APPARATUS FOR MAKING TAMPONS

William H. Burger and Howard A. Collins, Neenah, and Howard M. Ruth, Appleton, Wis., assignors to International Cellucotton Products Company, Chicago, Ill., a corporation of Delaware Application April 16, 1948, Serial No. 21,404

31 Claims. (Cl. 19—144.5)

1

This invention relates to a method and apparatus for producing tampons, more specifically catamenial tampons, and this application is concerned with that portion of a tampon making method and apparatus whereby an absorbent body is enclosed in a pervious jacket to form a tampon body which is adapted to be compressed to form the finished tampon.

The main objects of the invention are to provide a method and apparatus whereby a web or bat of absorbent material, such as cotton, wood cellulose or other absorbent material, may automatically be separated into tampon body units and automatically enveloped in a pervious jacket which will confine the absorbent material; to provide mechanism of the character indicated which will operate continuously at a good rate of tampon body production; to provide such mechanism which will produce substantially uniform tampon bodies suitably enclosed in pervious jackets; to provide mechanism for the purpose indicated which will be of simple character considering the operations performed, and durable and efficient; and other objects and advantages of the invention will be understood by reference to the following specification and accompanying drawings (14 sheets) wherein there is illustrated a practical and satisfactory form of mechanism embodying the principles of the invention.

In the drawings,

Figs. 3 and 4 are plan views which taken together, illustrate the mechanism;

Fig. 5 is a side elevation of the left hand end of the apparatus as seen in Fig. 1;

Fig. 6 is a section on the line 6—6 of Fig. 4;

Fig. 7 is a section on the line 7—7 of Fig. 6;

Fig. 10 is a section on the line 10—10 of Fig. 4;

Fig. 11 is a section on the line 11—11 of Fig. 8;

Fig. 12 is a fragmentary plan corresponding to a portion of Fig. 3 but showing the parts on an enlarged scale, certain parts being broken away and others shown in section to more clearly illustrate certain details;

Fig. 13 is a section on the line 13—13 of Fig. 12;

Fig. 14 is a section on the line 14—14 of Figs. 2 and 5;

Figs. 15 and 16 are elevations respectively on the planes represented by the lines 15—15 and 16—16 of Fig. 5;

2

Fig. 17 is a section on the line 17—17 of Fig. 15;

Fig. 18 is a fragmentary perspective illustrating a condition of the tampon body structure during its progress through the mechanism;

Fig. 19 is a section illustrating certain details of the tampon body structure immediately preceding its final separation into a single tampon body unit, and delivery as such from the apparatus;

Figs. 20 and 21 are plan sections corresponding to a portion of Fig. 12 but showing successive positions of the parts;

Fig. 22 is a fragmentary side elevation as represented by the line 22—22 of Fig. 12;

Figs. 23, 24 and 25 are fragmentary views showing portions of the mechanism apearing in Fig. 22 but showing successive positions of the parts, and Fig. 26 is a side elevation of a tampon body produced by the apparatus, a part of Fig. 26 being in section to illustrate a detail of construction.

According to the present invention, a tampon body adapted to be compressed to final tampon form and size is formed by first cutting from a web of cotton or other absorbent material, a body unit of absorbent material which is thereafter enrobed in a pervious jacket of knitted material which is knitted on the absorbent body. Successive tampon body units are delivered to knitting mechanism and they emerge from the knitting mechanism enclosed within a tubular casing of knitted textile material. The absorbent bodies are, however, spaced endwise from each other and they are connected together by means of tubes of knitted material formed intermediate the successive absorbent bodies. Such tubes of knitted material are severed intermediate their ends to form separate tampon body units each comprising an absorbent body enclosed in a pervious tubular jacket.

Figure 9:
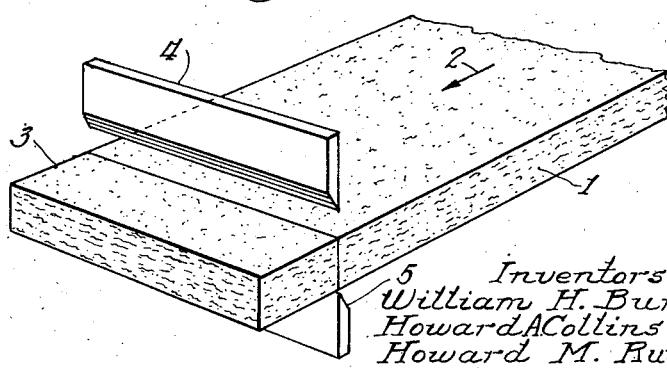
Fig. 9 is a perspective illustrating a step in the method of producing the tampon bodies.

For example, as presented in Fig. 9, a web 1 of absorbent cotton is propelled endwise in the direction indicated by the arrow 2 and end portions of the web, such as the portion represented at 3, are successively separated from the web by suitable means typified in this instance by upper and lower knives 4 and 5 respectively which cooperate to sever the strip of absorbent wadding. The separated absorbent body 3 is next propelled endwise into the throat of a knitting machine which applies a jacket 6 (see Figs. 18 and 19) of knitted material to the body 3. Successive bodies 3 are fed to the knitting mechanism in spaced relation, but the knitting machine is kept in operation so that intermediate the successive absorbent bodies, tubes 7 of knitted material are produced to integrally connect the successive absorbent bodies in linked, sausage-like form. A small amount of adhesive 8 is applied to the tube 7 of knitted material nearer to the end of one body than to the other end to thereby bond together threads which form the tube 7.

After the adhesive 8 has dried or set, the tube 7 is cut transversely at points, such as indicated at 9a and 9b in Fig 19. These cuts are made through the adhesively bonded areas so that the raw ends of jacket material resulting from the cutting at 9a and 9b will not unravel. Incident to the operation of the knitting machine, the knitted jacket 6 automatically closes itself over the opposite ends of the absorbent body 3 as indicated at 10a and 10b in Figs. 18 and 19, to prevent relative movement between the absorbent body and its surrounding jacket of knitted material. Such relative movement is, of course, in any event resisted by the frictional hold of the jacket 6 on the sides of the absorbent body 3.

A tampon body, such as represented in Fig. 19 between the cutting positions 9a and 9b, is a complete tampon body unit which is subsequently subjected to certain compressing operations to reduce the body to a practical catamenial tampon size. The method and apparatus for compressing the tampon forms no part of the present invention and are therefore not herein disclosed.

The apparatus herein shown for producing compressible tampon bodies embodies a frame structure, the various parts of which are designated 11, and said frame structure has secured to it a spindle 12 for supporting a roll 13 of absorbent webbing 1. In this instance, the spindle 12 is carried by the free end of a link 14 which is pivoted at its upper end as shown at 15, to an upstanding part of the frame structure. The web 1 of absorbent material is drawn from the roll 13 step by step and braking means is provided for preventing excessive unwinding of the supply roll 13 while at the same time avoiding interference with required unwinding thereof.

Such braking means comprises a brake lever 16 pivoted intermediate its ends as represented at 17, on a bracket or suitable part carried by the frame 11. One end of said brake lever 16 is weighted as indicated at 18, so as to cause its upper portion 19 to frictionally bear against the periphery of the supply roll 13. This weighted braking arrangement provides approximately uniform braking pressure on the supply roll throughout the gradual reduction in circumference of the roll. At least said braking pressure is sufficiently uniform for the purpose of the apparatus.

The web 1 may be of cotton or of wood cellulose or other absorbent material. For the purpose of explanation it may be assumed to be cotton. The absorbent material, especially when of cotton, tends to become compacted in the supply rolls whereas for purposes of tampon body production it is desirous that the material be quite fluffy; that is to say, expanded to a suitable extent. During the travel of the web 1 from the supply roll to mechanism for cutting end portions from the web, the web is subjected to a fluffing operation.

The fluffing mechanism consists of an oscillating plate or fluffer 20 (see Figs. 2, 6 and 7) which is hinged at one end as indicated at 21, to an element of the frame 11. At its free end, the fluffer 20 is connected by a link 22 to a crank pin 23 which, when actuated, serves to rock or oscillate the fluffer 20.

The web 1 is guided along a channel formed between side guides 24, 24 (see also Fig. 4) over a plate element 25. The side guides 24 and the plate element 25 may conveniently be formed of smooth surfaced material, such as glass or plastic material, for example, methyl-methacrylate resin, which is transparent and permits visual inspection of the material during its course of travel. The supporting plate 25 is provided with an opening 26 which is spanned lengthwise by a plurality of smooth straight rods 27 which have their opposite ends anchored in the table element 25, as best shown in Fig. 6. A part of the guide channel for the web 1 is covered by a suitable, smooth surfaced cover plate 28, which is also preferably of transparent material, such as glass or plastic material of the character indicated, to permit visual inspection of the absorbent material web. Said cover plate 28 overlies the opening 26 and extends beyond both ends of said opening as will be apparent from an inspection of Figs. 2, 4 and 6. The cover may be hinged to one of the side guides 24, as shown in Fig. 7.

As the web 1 is propelled step by step over the opening 26, the fluffer 20 is oscillated up and down so that it more or less pumps air into the channel through which the web 1 travels, such air being of course forced into the web to thereby more or less blow it up; that is to say, to effect fluffing of the web. The rods 27 prevent the web from being sucked down through the opening 26 while permitting a free flow of air into the channel when the fluffer 20 moves upwardly or toward the channel. Said fluffer is rocked within a chamber formed by side members, such as represented at 29 and an end member 30 together with the frame element on which the fluffer is hinged.

The crank pin 23 which actuates the fluffer is carried by a disc 31 which is mounted on one end of a shaft 32 journaled in suitable frame supported bearings, as best shown in Fig. 6. The shaft 32 is driven continuously and for that purpose it is provided with a sprocket 33 (see Figs. 1 and 2) which is driven by means of a chain 34, the latter being driven by means of a drive sprocket 35 (see Fig. 1) on the output shaft 36a of a variable speed Reeves drive 37. The Reeves drive is driven by an electric motor 38 and a suitable chain drive 39 which connects the motor to the variable speed unit. The chain 34 is guided in part by an idler sprocket 40 suitably positioned and mounted to cause the chain 34 to clear portions of the frame 11. The connecting rod or link 22 is connected at its opposite ends to said crank pin and to the fluffer 20 by means of suitable ball and socket or Universal joints, which permit shifting of the angular position of the link relative to the crank pin and fluffer incident to the different positions of these parts.

Figure 2:
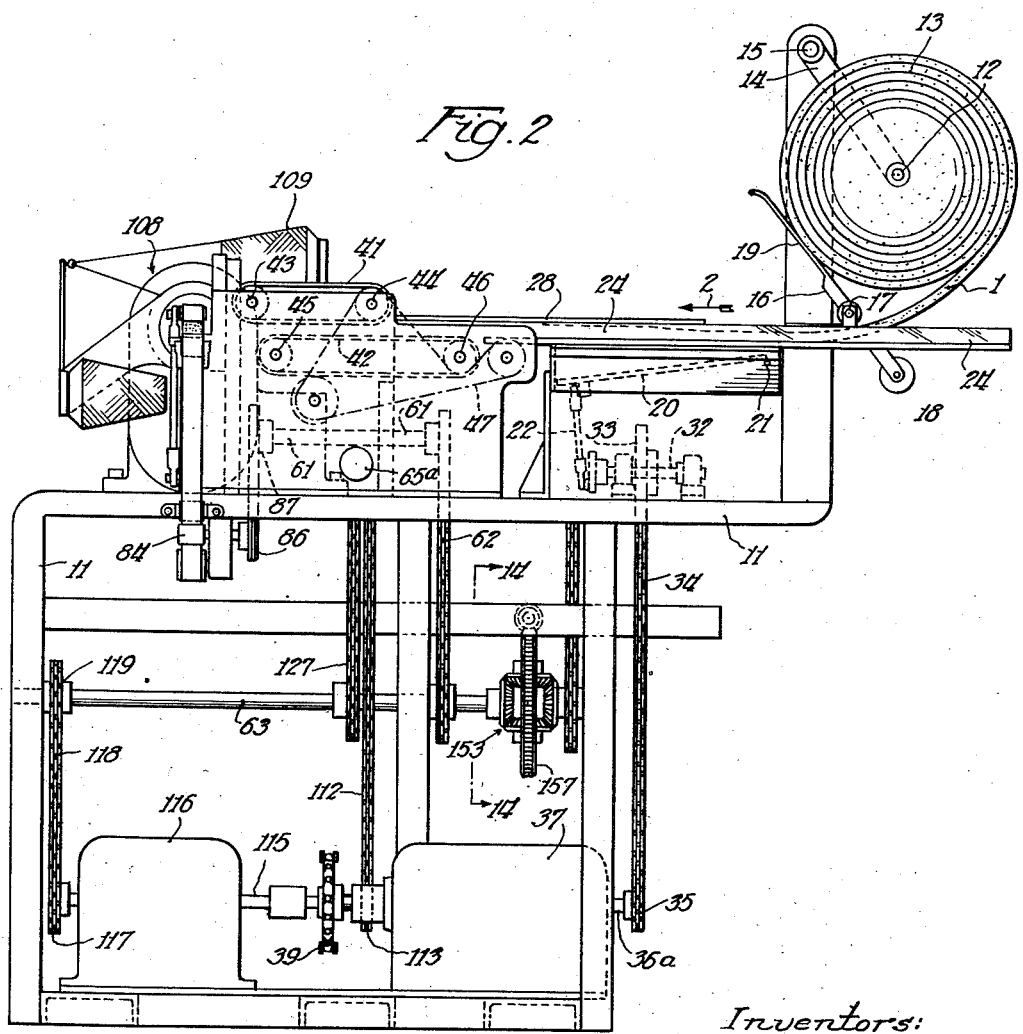
Fig. 2 is an end elevation illustrating the right hand end of the mechanism as viewed in Fig. 1.
Figure 8:
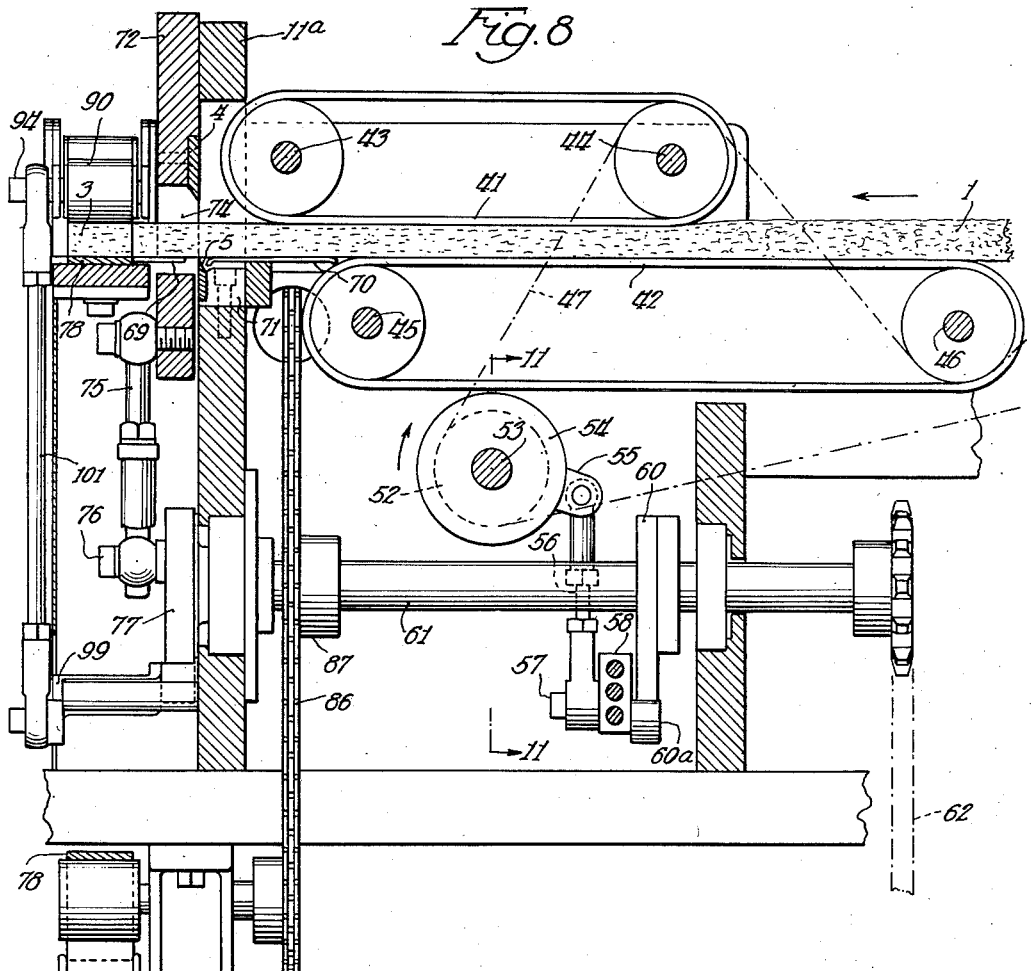
Fig. 8 is a section on the line 8—8 of Fig. 4.

The absorbent web 1 is propelled step by step by means of a pair of endless belts 41 and 42, which have adjacent reaches disposed in substantially parallel relation so as to be adapted to receive between them the said web 1 (see Figs. 2, 4 and 8). The conveyor belt 41 is guided by pulleys carried by shafts 43 and 44 respectively which are suitably journaled in side plate elements of the frame structure 11 and the belt 42 is similarly supported by means of pulleys carried by the shafts 45 and 46 which are also journaled in the side plates of the frame. These conveyors 41 and 42 are interconnected for simultaneous intermittent feed movement in such a manner that the adjacent reaches of the belt travel in the same direction. For this purpose an endless chain 47 is supported by a sprocket 48 (Fig. 4) on the shaft 44 of the upper belt, a sprocket 49 on the shaft 46 of the lower belt, an idler sprocket 50 on the shaft 51 which is supported in the side members of the frame 11, and a sprocket 52 which is mounted on one end of a shaft 53 which is also mounted in said frame side plates.

The shaft 53 is intermittently rotated in the proper direction to intermittently advance said chain 47 and the belts 41 and 42, by means of a one-way clutch structure 54.

The one-way clutch 54 (see Figs. 8 and 11) may be of any suitable kind, many of which are well known, and wherefor no details of the clutch structure are shown. However, it includes a member having an ear 55 which is connected by means of an adjustable link 56 to a pin 57 which is adjustable along the length of a pivoted lever 58. The lever 58 is pivoted as indicated at 59 in a bracket carried by one of the side plates of the frame structure, and the said lever is adapted to be rocked about the axis of said pivot 59 by means of a rotating cam 60. The cam 60 is carried by a shaft 61 which is suitably supported for rotation and said shaft is driven by means of a chain drive 62 which connects the shaft 61 to a driven countershaft 63 which is rotatably mounted in the frame structure (see Figs. 2, 8 and 11).

The cam 80 acts against a roller 60a carried by a portion of the pivoted arm 58 to effect the required rocking of said arm. Spring means 58a may be provided for normally urging the arm 58 to rock in one direction so as to maintain its roller 60a in operative engagement with the cam 60.

The clutch structure 54 is so arranged that clockwise movement imparted to the clutch member 55 (as viewed in Fig. 8) will effect clockwise travel of the chain 47 and thereby simultaneous movement of the belts 41 and 42 in opposite directions as aforesaid. On the return movement of the clutch element 55, the chain 47 will not be driven so that the belts 41 and 42 remain stationary during such return movement of the clutch member. The extent of movement imparted to the belts 41 and 42 may be regulated by adjusting the position of the pin 57 on the lever 58 (see Fig. 11). Such adjustment may be effected by turning the screw 65 which is suitably journaled in the arm 58, said screw serving to adjust the block 66 which carries the pin 57 along the arm 58.

A suitably formed knob 65a is secured to an accessible outer end of the screw 65 to facilitate making of the indicated adjustment of the extent of feed movement of the belts 41 and 42.

It will be seen that the belts 41 and 42 are capable of being driven selected distances to successively or intermittently advance the web 1 uniform predetermined distances each time that the web is advanced.

The upper and lower cutting knives 4 and 5 respectively, previously mentioned in connection with Fig. 9, are embodied in the machine for cutting off advanced end portions of the web 1 which are supported by a suitable plate element 69. Intermediate the lower cutting knife 5 and the delivery end of the lower feed belt 42, the web 1 may be supported by a suitable plate element 70.

The lower knife 5 is a stationary blade which is fixedly mounted on the plane structure through the agency of a mounting block 71. The upper knife 4 is a vertically reciprocable knife, this knife being mounted in a carrier plate 72 which is guided for vertical reciprocation in ways formed between the upper portion of a vertical frame element 11a and guide strips 73, 73 which are secured to said frame element through the agency of spacing blocks as best shown in Fig. 4.

The member 72 has an opening 74 therein under the knife 4 and through which the web 1 passes. The lower portion of the member 72 is connected by means of a link 75 to a crank pin 76 carried by a cam disc 77 which is secured to the driven shaft 61. The link or connecting rod 75 is adjustable in respect of its length so that the extreme up and down positions of the knife 4 may be adjusted to secure the best operating performance. It will be observed that the cutting knife 4 is actuated in timed relation to the actuation of the web feed belts by being driven from the feed belt drive shaft 61, the cutting knife being caused to cut the web while the web and its feed belts remain stationary.

The tampon body unit of webbing severed from the web is fed horizontally from the supporting plate element 69 to a conveyor belt 78 as an incident to the advancement of the web 1.

The conveyor belt 78 travels transversely of the direction of feed of the webbing 1 and lengthwise of the tampon body 3 which is cut from the web. Said conveyor belt is supported on an elongated transversely extending platform 79 and is guided over suitably journaled supporting rollers 80 and 81 adjacent the ends of said platform. The belt travels counterclockwise as viewed in Figs. 1 and 10, and from the roller 80 it progresses around rollers 83, 84 and 85 to the said roller 81. The rollers 83, 84 and 85 are, of course, suitably journaled on the frame structure or in brackets carried thereby and one of said rollers, for example the roller 83, may be adjustably mounted so as to facilitate adjustment of the tightness of the belt 78.

The belt 78 is continuously driven by a chain drive comprising the chain 86 which transmits power from a sprocket 87 on the continuously driven shaft 61 to a sprocket mounted on the shaft of the roller 84 against which the belt is held with sufficient force to cause the belt to be driven incident to the rotation of said roller 84. The chain 86 also engages sprockets carried by the shafts 88 and 89 which respectively support conveyor belts 91 and 90 which cooperate with the belt 78 to feed the tampon bodies in an endwise direction.

Figure 1:
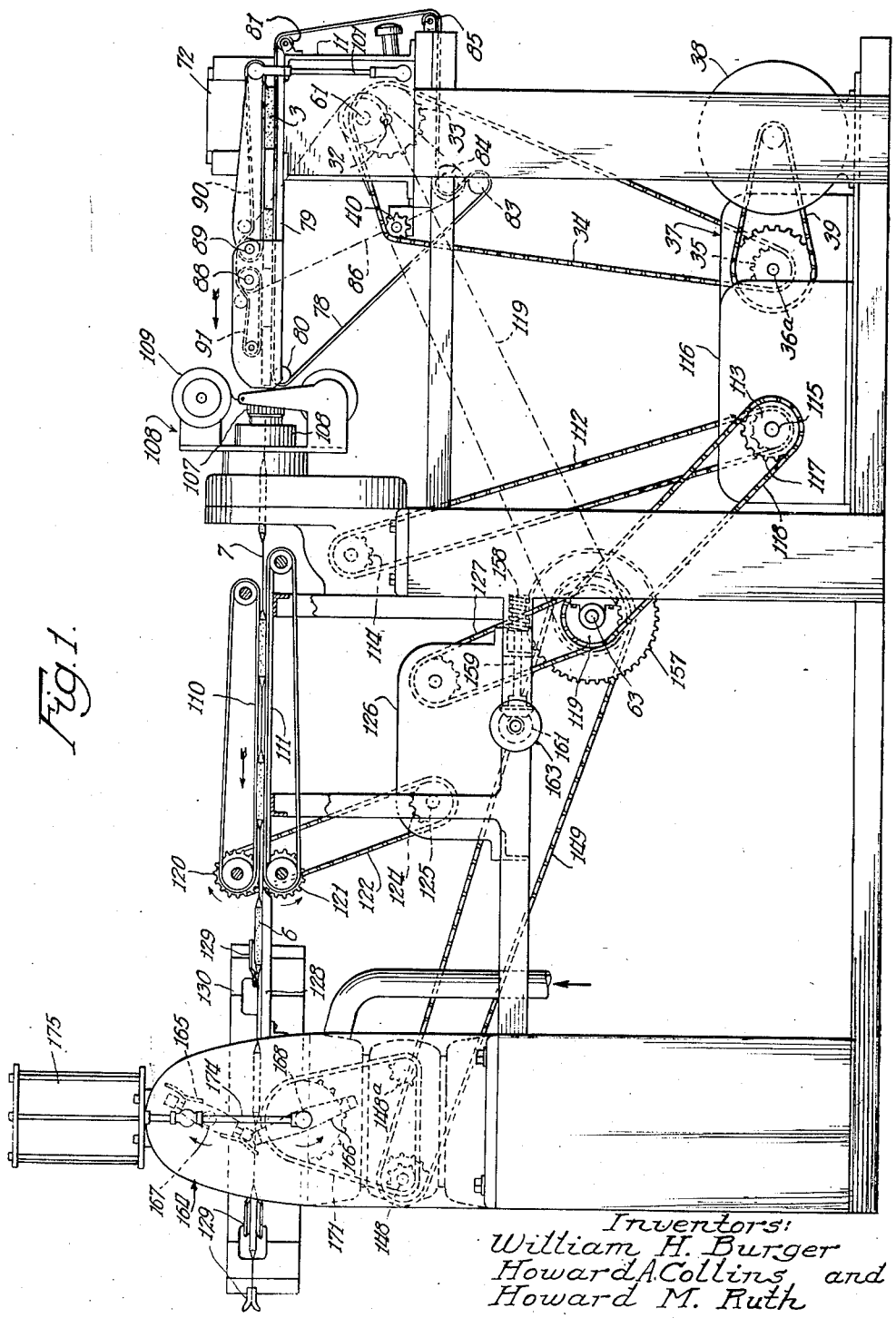
Fig. 1 is a side elevation.

The belt 90 is supported by pulleys 92 and 93 which are respectively mounted on the shafts 89 and 94 (see Figs. 1, 4 and 10). The shaft 89 is fixedly or rotatively mounted in frame side elements 11b, 11b and the shaft 94 for the pulley 93 is mounted in the adjacent ends of side arms 95 which have their forward ends pivotally mounted on the shaft 89. A belt tightening pulley 96 is also mounted in said arms 95, preferably in an adjustable manner so as to permit adjustment of the tautness of the belt 90.

The belt 90 is capable of being rocked vertically about the axis of its shaft 89 so as to open and close its receiving end portion relative to the receiving portion of the underlying belt 78. This rocking movement of the belt 90 is provided so that during the edgewise feed of the last cut tampon body from the support 69 to the belt 78, the belt 90 may be in an elevated position in which it affords no resistance to the delivery of the tampon body to the belt 78.

Rocking movement of the belt 90 relative to the belt 78 is effected in properly timed relation to the feed of the tampon bodies to the belt 78 by means of a cam 97 which is formed on the periphery of the crank pin disc 77. Said cam 97 acts against a roller 98 carried by one end of an arm 99 which is suitably pivotally mounted intermediate its ends as indicated at 100. The other end of said arm 99 is connected by means of a link 101 to a projecting end portion of the shaft 94. It will be apparent that rocking movement of the arm 99 effected by the cam 97 will be transmitted to the link 101 to the free end of the conveyor carrying arms 95 so that periodically the free or receiving end portion of the conveyor will be elevated and then lowered in respect to the conveyor 78. The cam is, of course, so timed that the conveyor 90 will have its receiving end portion in an elevated position relative to the conveyor 78 during the movement of the tampon body 3 from the support 69 to the belt 78.

The conveyor 91 is supported by a pulley 102 on the shaft 88 and a pulley 103 on a shaft 104. The shafts 88 and 104 are suitably mounted in the frame members 11b and a belt tightening roller 105 associated with the belt 91 and suitably mounted in the frame members 11b is provided. The belt 91 is continuously driven but maintains a fixed relation to the operative reach of the belt 78 so that the lower reach of the belt 91 and the adjacent reach of the belt 78 are operative to feed the successive tampon bodies at a substantially uniform rate of speed into the hollow 106 of a knitted textile tube 6 which is being formed in the head 107 of knitting mechanism 108. The tampon bodies will be gripped by the threads of the tube as the latter is formed so that said bodies will thereupon be propelled in unison with the knitted tube. The belts 78, 90 and 91 are, of course, driven at the same rate of speed.

The knitting or braiding machine 108, which may be of more or less conventional design, include supports for a pair of spools 109, 109 of the desired yarn or thread which is delivered to said knitting head 107 (or to a braiding head) which operates to form the tubular jacket 6 around the absorbent bodies 3 and the empty tubing 7 which connects the successive bodies (see Fig. 18). The spools 109 rotate about the horizontal axis of the knitting machine and the jacketed absorbent bodies emerge from the knitting apparatus to be received between the adjacent reach of upper and lower continuously driven conveyor belts 110 and 111 respectively (see Fig. 1).

The knitting apparatus is driven continuously by means of a driving chain 112 (see Figs. 1, 2, and 4) which is driven by the output sprocket 113 carried by an output shaft 36b of the variable speed Reeves drive 37, and said chain engages a sprocket 114 carried by the drive shaft of the knitting apparatus.

The output shaft of the variable speed drive 37 which carries the sprocket 113 is coupled to the input shaft 115 of a speed reducing unit 116 which has an output shaft provided with a sprocket 117 for driving a chain 118 which drives the countershaft 63 through the agency of a suitable sprocket 119.

The belts 110 and 111 are so placed that their cooperating reaches grip the jacket enclosed and jacket connected tampons between them so as to maintain the required tension on the knit tubing to pull it out of the knitting machine. These belts are geared together at their delivery ends by means of inter-meshing gears 120 and 121 and they are driven by means of a chain 122 which engages a sprocket carried by the shaft 123 of the upper belt 110 and a sprocket 124 carried by the output shaft 125 of a suitable variable speed drive 126. The variable speed drive unit 126 is driven by means of a chain 127 which engages a sprocket carried by the driven countershaft 63 and a sprocket carried by the input shaft of said drive 126 (see Figs. 1 and 3). The variable speed drive 126 provides an effective control of the tension applied to the knitted tubing by the cooperating drive belts 110 and 111.

The tension belts 110 and 111 deliver the connected string of tampons to a transfer plate or table 128 which supports the bodies in position for delivery to receiving clips or brackets 129, 129 carried on the periphery of a horizontally rotatable drum 130. As best shown in Figs. 12 and 13, the drum consists of upper and lower plates 131 and 132 which are peripherally united by a series of tie plates 133 which are bent to conform to the flats of the peripheries of said upper and lower plates 131 and 132. The drum has a central or hub member 134 which also serves to unite the upper and lower plates and to provide a socket 135 for receiving the upper end portion 136 of an axially vertical rotatable shaft 137.

The shaft 137 is journaled for rotation in a bearing 138 formed in a manifold 139 and in a bearing 140 formed in a barrel-shaped housing member 141. The member 141 is supported from a suitable frame member as shown in Fig. 5, through the agency of a supporting base 142. The manifold 139, the housing 141 and the base 142 are suitably bolted together and the base is in turn bolted to the frame on which it is mounted.

A collar or flange 143 formed on the shaft 137 engages a thrust bearing 144 seated on the upper end of the bearing sleeve 138 to support the weight of the shaft and parts carried by its upper end. A valve plate 145 is seated on the upper end of the manifold 139 and on the upper end of the thrust bearing 144 so as to cooperate with the flange 143 and thrust bearing to support the rotary drum 130.

Continuous rotation is imparted to the rotary drum 130 by means of a worm and worm wheel drive consisting of the worm wheel 146 which is secured to the shaft 137, and a worm 147 which meshes with the worm wheel 146 and is secured to a shaft 148 so as to rotate therewith. The shaft 148 is journaled in suitable bearings carried by the frame structure (see Figs. 3 and 5) and said shaft is driven by means of a chain 149 which meshes with a suitable sprocket 150 carried by the shaft 148 and a suitable sprocket 151 which is secured to or formed integral with the pinion 152 of a differential gear drive structure, indicated at 153. Said differential drive 153 includes another bevel gear 154 which is secured to the continuously driven countershaft 63. The gears 152 and 154 mesh with an opposed pair of sun gears 155, 155. The sun gears 155 are journaled for rotation on shafts 156, 156, (see Fig. 14) which project from a central member 156a, the latter being journaled on the shaft 63 intermediate the gears 152 and 154. The shafts 156 carry a worm wheel 157. The worm wheel 157 being normally stationary, it will be seen that rotation of the shaft 63 and its pinion gear 154 will be transmitted through the sun gears 155 to the pinion 152 and said sprocket 151 so as to thereby drive the shaft 148 and the turret 130.

The worm wheel 157 is normally held stationary by reason of its meshing engagement with a worm gear 158, the latter being carried by a shaft 159 which has a bevel gear 160 meshing with a similar bevel gear 161 on the shaft 162. The shaft 162 is journaled in suitable bearings provided in the frame structure and extends to an accessible place outside of the machine where it is provided with a hand wheel 163 to facilitate manual turning of the shaft and of the worm 158 and worm wheel 157. It will be seen that by manually rotating the worm wheel 157 and the gears 155 about the shaft 63, rotation of the drive sprocket 151 will be advanced or retarded in accordance with the direction in which the worm wheel 157 is turned. Such advancing and retarding of the drive sprocket 151 is, of course, reflected in corresponding advancement or retarding of the turret 130. This manual adjustment facilitates adjustment of the position of the rotating turret 130 so as to position its U-shaped clips 129 in proper position for receiving the jacketed tampon bodies from the belts 110 and 111 and the table 128.

Figure 3:
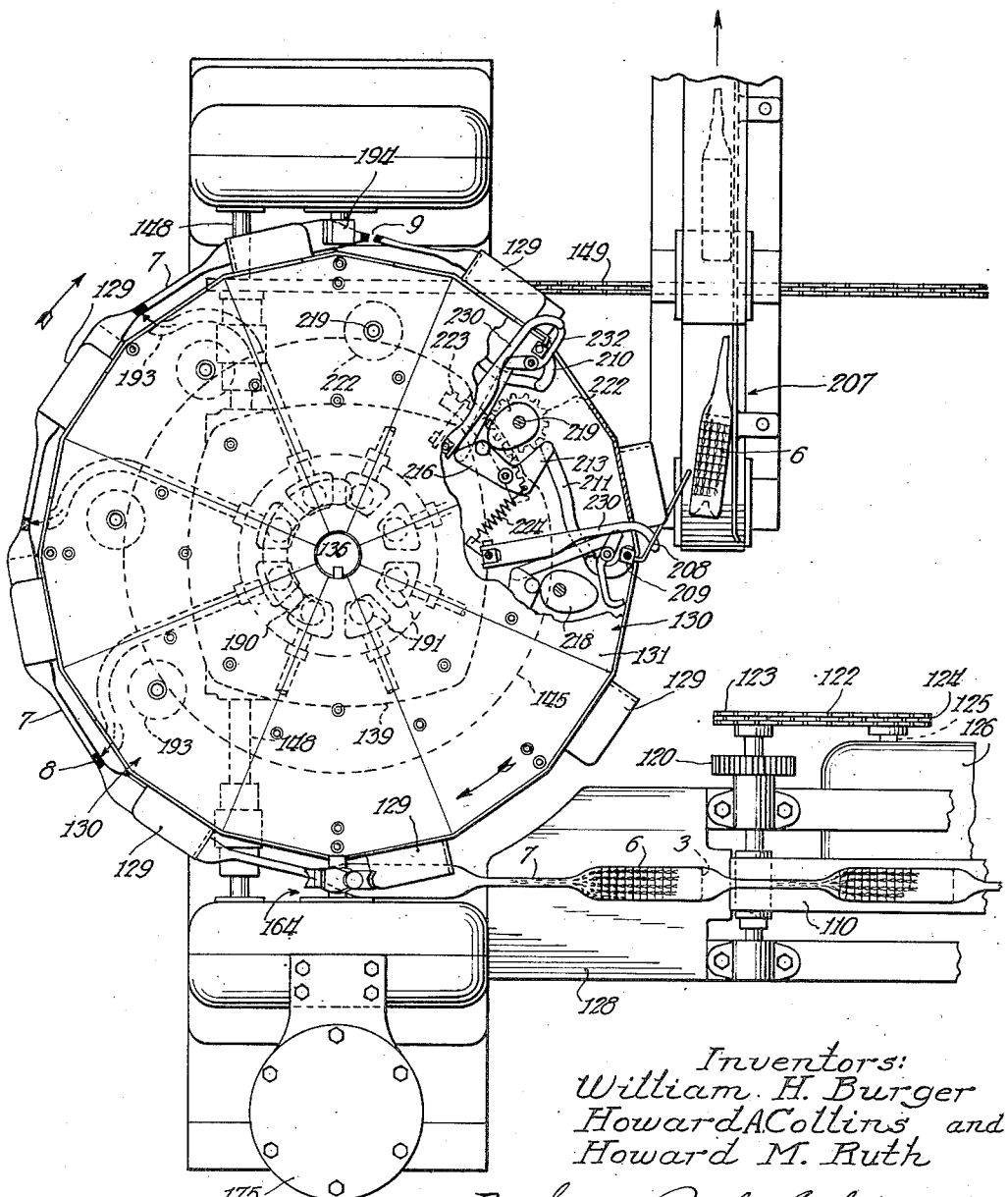

By reference to Figs. 3 and 5, it will be seen that the arrangement is such that the successive tampon bodies are each received by one of the holders 129 while the string of connected tampons continues its endwise travel. The drive for the rotating turret 130 is, of course, suitably timed so that a holder 129 will be presented for each jacketed tampon body issuing from the delivery belts 110 and 111.

The cement or adhesive band 8 (Figs. 18 and 19) is applied to the reduced diameter tube 7 of knitted material which extends between the receiving holder 129 and the next advanced holder 129. The adhesive applying mechanism is indicated in its entirety at 164 (Figs. 1, 3 and 5) and it is shown in greater detail in Figs. 15 and 17. It consists of upper and lower rotating arms 165 and 166 respectively, these arms being respectively carried by upper and lower rotating horizontal shafts 167 and 168 respectively. These shafts 167 and 168 are journaled in suitable bearings carried by an upstanding frame part 11 provided for that purpose and they are geared together by means of inter-meshing gears 169 and 170 so that they rotate in unison. The shaft 168 is driven by means of a chain 171 (Figs. 1 and 5) which engages a sprocket on the shaft 168, a sprocket on an extension of the shaft 148 and an idler or guide sprocket 148a suitably journalled in said upstanding frame part. The said arms 165 and 166 are thereby driven in a predetermined timed relation to the drive of the turret 130.

The required adhesive may be applied by either of these arms 165 or 166 while the other co-operates to position the tube material in adhesive receiving relation to the applicator, or if preferred or advantageous, both arms could be made to apply adhesive. In this instance adhesive is applied by the lower arm 166 while the tubing material is positioned by the upper arm. To that end, the lower arm 166 is bored longitudinally as indicated at 172 to communicate with a bore 173 in its supporting shaft 168. Said bore 173 communicates through suitable valved piping 174 with an adhesive supply tank 175. The outer ends of the bore 172 in the arm 166 are provided with check valves which include ball members 176, 176 adapted to be seated on shoulders 177 formed in arm ends or tips 178 which are screwed on the ends of the arm 166 as best shown in Fig. 17. Springs 179 housed in enlargements of the outer ends of the bores 172 serve to yieldingly hold the valve balls 176 seated on the valve seats 177 so as to normally prevent adhesive from being discharged out of the ends of the rotating arm 166.

As shown in Fig. 17, the arm tips 178 are provided with recesses 180 into which a portion of the knitted tube 7 enters during its travel with the rotary turret 130.

The upper arm 165 is provided with presser heads 181 carried by stems 182 which are slidably mounted in suitable sockets in the ends of the arm 165. Springs 182a are provided around said stems and between the heads 181 and the ends of the arm 165 to normally urge said presser heads outwardly. Such movement is, however, limited by means of cross pins, such as indicated at 183, which are carried by the ends of the arm 165 and which pass through slots 184 provided in the respective stems 182. The arms 165 and 166 are so related that their ends mesh with each other, the presser members 161 of the upper arm being so shaped (see Fig. 17) as to enter the recesses 180 of the ends of the lower arm 166. The presser members are so formed that they will press the knitted tube material 7 downwardly against the valve ball 176 with sufficient force to unseat the valve ball thereby permitting a small amount of adhesive to escape from the ends of the lower arm and under the overlying knitted material 7. The duration of contact between the ends of the arm is sufficiently short and the viscosity of the adhesive material employed is such that only a drop or so of adhesive escapes; that is to say, only enough adhesive escapes to effectively wet a small bank of the tubular knitted material 7, as indicated at 8 in Fig. 18.

To permit the lower arm 166 and its tubular shaft 173 to rotate relative to the adhesive delivery pipe 174 a suitable rotary slip joint fitting 185 is employed for connecting the rotary shaft to the relatively stationary delivery pipe.

To insure proper gathering of the knitted tube material 7 and its entry into the recessed seat 180 of the lower arm 166, the upper arm 165 is provided with gathering clips 186, 186 on its ends. Said gathering clips are secured to the leading sides of the arm ends and they have their outer ends of more or less V-shaped recessed form as indicated at 187 so as to effect the desired gathering and introduction of the knit tubing 7 into the said recessed seats.

Suitable quick drying adhesive may be employed, if desired, so that the adhesive will be adequately set before the station is reached where the tubing 7 is severed to separate the tampon bodies into relatively independent units. However, we prefer to provide means for accelerating the dry-in of such adhesive and this is done in the present instance by directing a flow of warm or dry air against the adhesive bearing tube while it travels from the adhesive applying station to the cutting station. For that purpose, manifold 139 (Fig. 13) is connected by means of a suitable conduit 188 to a source of hot or dry air, and such dry air is delivered from said manifold into certain chambers 189, 189 formed in the hub member 134 of the turret structure 130 (see Figs. 12 and 13). For this purpose, the plate 145 is provided with an arcuate opening 190 which is of such length as to communicate simultaneously with three or four holes 191 in the bottom plate 132 of the turret structure. There is a hole 191 in said bottom plate for each of the chambers 189 formed in the hub casting so that during a portion of the rotation of the turret structure air will be delivered from the manifold 139 into a plurality of the chambers 189 as will be readily understood from an inspection of Fig. 12. The chambers 189 each have outlet openings 192 in their outer side walls and discharge or blow pipes 193 are seated in said openings 192 so as to communicate with said chambers. Said blow pipes 193 are so shaped and positioned that their discharge ends direct a flow of drying air against the adhesive zone 8 for about one-half of the rotation of the turret. This is sufficient to dry suitably selected adhesive.

The mechanism for cutting the tube connected tampon units into separate tampons is somewhat similar to the adhesive applying mechanism except that instead of an adhesive discharge nozzle and presser element the cutting mechanism includes cutting knives or tips on one arm and cooperating anvils on the ends of the other arm. This cutting mechanism is shown in Figs. 3, 5 and 16.

By reference to Figs. 3 and 5 it will be seen that the cutting mechanism is located substantially diametrically opposite to the adhesive applying mechanism, the cutting mechanism being mounted in another upwardly extending hollow post-like part of the frame structure. Said cutting mechanism comprises upper and lower arms 194 and 195 respectively, the same being carried by upper and lower shafts 196 and 197 which are suitably journaled in said hollow frame post.

The shafts 196 and 197 carry sprockets 198 and 199 respectively through the agency of which a chain 200 drives said cutter arms. As shown in Fig. 16, the chain is so threaded around the sprockets 198 and 199 that the cutter arms are rotated in opposite directions but in suitably synchronized relation to bring their cooperating ends into registry. The chain 200 is driven by a drive sprocket 201 on the driven shaft 148 and it is also guided by means of an idler sprocket 202 so as to maintain its operative engagement with a sufficient number of teeth of the lower sprocket 199.

The upper cutter arm 194 has mounted on its ends suitable cutters 203, 203, the same being suitably removably mounted so as to permit replacement thereof when required. Similarly the ends of the lower arm are provided with removably mounted anvil elements 204 so that these anvil elements may be replaced when required. Provision may be made for adjusting the anvils 204 toward and from the cutters, this means comprising in the present instance, wedge blocks 205 which are adapted to be adjusted by adjusting screws 206.

By reference to Fig. 16 it will be seen that the cutter members 203 and the anvil members 204 come together in such relationship that the knit tubing 7 will be severed as shown at 9 in Fig. 3.

Although other operations, hereinafter described, may be performed on the tampon bodies before they are cut apart, it is feasible to cut them apart as described and to eject them from the holders 129 and to deliver them into a receptacle or to a conveyor, such as represented in its entirety at 207 in Fig. 3. The conveyor 207 may conduct the separate tampon bodies to mechanism for further treating. However, in some instances the short, leading end portions of the jackets may be suitably bound or anchored, for example, by being tucked back into the adjacent end portion of the absorbent body.

Assuming that the tampon bodies are to be discharged from the holders 129 without further treatment after cutting of the jacket, suitable ejecting mechanism is next actuated. Such ejecting mechanism is shown in Figs. 3, 12, 13 and 21 of the drawings. It comprises an ejecting arm 208 in the bottom of each holder 129, said ejecting arm being secured to a post 209 which has its opposite ends pivotally mounted in the upper and lower plates 131 and 132 of the turret structure (see Fig. 13). Said pivot post 209 has an arm 210 extending therefrom and said arm is connected by means of a link 211 to the free end 212 of one arm of a small bell crank 213. Said bell crank 213 is secured to a sleeve 214 which is rotatable on a pin 215 which is carried by said upper and lower turret plates. The other arm 216 of said bell crank has its free end provided with a roller 217 which engages the edge of a cam 218 which is mounted on a rotatable shaft or post 219, the latter being suitably journaled in the turret plates 131 and 132.

The cam 218 has a hub part 220 and the cam may be pinned as indicated at 221, to the shaft 219 so as to rotate therewith. The shaft projects through the lower plate 132 and has a gear or pinion 222 secured to its lower end so that rotation of the gear 222 will be imparted to the shaft 219 and said cam 218. Said pinion 222 is adapted to mesh with a gear segment 223 which is suitably secured to the bottom of the stationary valve plate 145 as best shown in Fig. 13. The gear segment 223 is so located and it is of such length as to cause the cam 218 to make one complete turn during its travel through the arc of said gear segment 223. As the cam 218 rotates it acts against the cam roller 217 to rock the bell crank and to thereby transmit motion through the link 211 and arm 210 to the ejector arm 208, one of which is shown in an open or ejecting position in Figs. 3 and 21.

A spring 224 stretched between a portion of the bell crank arm 213 and a fixed pin 225 serves to normally hold the cam following roller in engagement with the cam 218.

The cam 218 is held against rotation during its travel except when being rotated by the gear segment, by having the gear 222 provided with a hub 226 which is provided with a cut back arcuate surface portion 227 which is adapted to engage the normal periphery 228 of the valve plate 145. Said valve plate has its periphery recessed as indicated at 229 in registry with the gear segment 223 so as to permit rotation of the gear and cam during the travel of the cam opposite the gear segment 223.

In the production of one type of tampon, it is desirable to tuck one end of the tubular jacket into the end of the absorbent body. This operation may be automatically performed while the tampon bodies remain in the holders 129 on the turret. Mechanism for performing the said tucking operation is shown in Figs. 3, 12, 13, 20 to 25 of the drawings.

The tucking mechanism comprises a pair of spreader arms 230 and 231 and a tucking finger 232. The spreader arms 230 and 231 extend approximately radially of the turret, and have their inner ends pivotally secured, as indicated at 233 on a square shaft 234 which is rotatable on a pivot shaft 235. The pivot shaft 235 extends between and is secured at its ends to the turret top and bottom plates 131 and 132.

Intermediate their ends, the spreader arms 230 and 231 are provided with rollers 236 which engage the upper and lower cam surfaces 237 of a cam wheel 238 which is secured to the shaft 219. This shaft 219 is the one which is rotated once in each turn of the drum by engagement of its gear 222 with the segment 223. A spring 239 is stretched between intermediate portions of said spreader arms 230 and 231, and serves to yieldingly pull said arms toward each other, thereby maintaining their respective cam rollers 236 in engagement with said cam edges 237.

The cams 237 and the spring 239 cooperate to effect movement of the free end portions of the spreader arms 230 and 231 toward and from each other according to a predetermined pattern.

The spreader arms, in addition to being movable toward and from each other, are also adapted to be rocked a limited amount about the axis of the pivot shaft 235. Such rocking is effected by means of a cam flange 240 on the cam wheel 238 and a roller 241 carried by the lower spreader arm 231 in position to engage the cam 240. The spring 224 which has heretofore been referred to in connection with the operation of the ejector 208, also serves to yieldingly impart horizontal rocking movement to the square shaft 234 about the pivot shaft 235, the pin 225, to which one end of the spring 224 is anchored, being secured to said square shaft 234. The cam-engaging roller 241 is thereby maintained in operative engagement with the cam 240.

The free end portions of the spreader arms 230 and 231 extend toward each other as shown best in Figs. 13 and 25, and at their extremities they are provided with parallel tapered point portions 242 and 243 respectively which extend toward the end of the tampon body in the adjacent holder 129. In the arrangement shown, the shorter of the two jacket end extensions is the one which is to be tucked into the absorbent body as indicated in Fig. 12.

The mode of operation of the spreaders 230 and 231 will be best understood by reference to Figs. 22, 23, 24, and 25 which, in the order named, illustrate successive positions in the cycle of operation of these fingers. As shown in Fig. 22, the spreader fingers are in their maximum spaced position in which they embrace between them the short projecting end portion of the wrapper or jacket. The cams 237 next permit the spreader fingers and their parallel pointed ends 242 and 243 to approach each other so as to grip the said projecting jacket portion between them as shown in Fig. 23. The arms 230 and 231 are then caused by the cam 240 to rock horizontally about the pivot shaft 235 whereby the pointed end portions 242 and 243 approach and force their way into the end portion of the jacketed body element 3, the gripped portion of the jacket being, of course, carried with the pointed ends back into the body. Such horizontal rocking movement of the spreader arms continues until the limit of penetration of the tampon body has been reached as represented in Fig. 24, and during the latter portion of such penetrating movement, said arms 230 and 231 are caused by the cams 237 to separate thereby effecting splitting or separation of the engaged end portion of the tampon body as shown in Fig. 24.

When the arms 230 and 231 have separated to a sufficient extent, the tucker 232 is moved between the spreader arms and engages the wrapper material remaining therebetween to force it inwardly of the tampon body approximately as represented in Fig. 24. Thereafter, the tucker finger 232 and the spreader arms are rocked away from the adjacent end of the tampon body, thereby permitting the separated end portions thereof to come together and to embrace the tucked-in wrapper portion as represented in Figs. 24 and 25. Owing to the more or less flimsy character of the wrapper material, the wrapper will not necessarily be tucked into the smooth inwardly extending condition illustrated in Figs. 25 and 26, but it will nevertheless be tucked inwardly in a satisfactory condition so as to obtain the indicated anchoring effect of the tampon body on the tucked-in end portion of the jacket.

The tucking movement of the tucking finger 232 is effected automatically in the required synchronized relationship to the operation of the spreader arms 230 and 231. To that end the tucking finger 232 is pivotally mounted on a pivot shaft 244 which is supported in the top and bottom plates of the turret or drum. An arm 245 is rigidly secured to the hub of the tucking finger 232, and said arm is connected by means of a link 246 to a portion of the bell crank arm 216 which is periodically rocked by the action of the cam 218. The cam 218 is so adjusted that movement of the bell crank arm 216 will occur at the time required for the proper operation of the tucking finger 232. The ejecting member 208 operates simultaneously with the operation of the tucking finger, but in the next preceding holder 129.

The described apparatus operates continuously to produce from a web of absorbent material and spools of thread, absorbent tampon bodies which, by subsequent compressing operations not herein shown, are converted into practical and efficient compacted catamenial tampons. It may be observed that when compacted catamenial tampons are placed in use, they are intended to reexpand to substantially fill the vaginal cavity. By increasing the thickness of the body material by the described fluffing operation, the cross-sectional size of the body units is increased so that, when the jacket is formed around the body units, said jacket will be of greater diameter than would have been produced if the fluffing operation were omitted. Hence, the jackets will be large enough to avoid undue restriction of reexpansion of the compacted tampons which may be formed from the uncompressed bodies made as herein described. For easy handling, the uncompressed tubular, jacketed and jacket interconnected bodies may be delivered directly from the described turret 130 into further processing mechanism without being separated into independent units. However, for some purposes it is preferred to separate the bodies as described for independent handling and delivery to other processing mechanism which may be operated entirely independently of the mechanism herein described, being in some instances fast enough in operation to handle tampon bodies supplied from several units of mechanism of the type herein described. However, it will be understood that it is also feasible to conduct the tampon bodies either in independent separated form or in jacket connected form directly from the mechanism herein described to other mechanism for performing additional operations on the tampon bodies.

In the described apparatus, a turret arrangement is employed for propelling the material through a circular path of travel while various operations are performed thereon. Of course, the material may also be propelled by suitable conveying means, through either a circular, arcuate or even a straight path of travel, and the desired operations performed on the material by devices located adjacent to the selected path of travel or moved in parallel relation thereto to act on the material while it travels. Also, the described arrangement employs continuous movement of the material while it is being acted upon, but intermittent movement and operation on the material during periods of rest may be employed if preferred.

Various changes in the described mechanism may be made while retaining the principles of the invention described.

We claim:

1. The method of making tampons which comprises the steps of successively cutting from the end of a web of body material sections of predetermined width, feeding said sections continuously in an endwise direction and horizontally in spaced relation to each other, forming a continuous tubular jacket about said sections, whereby there is provided unfilled jacket material intermediate the successive sections, applying pulling force to the jacketed sections so as to propel said sections through mechanism for forming said tubular jacket, and subsequently severing the jacket material intermediate said successive sections to thereby form independent tampon units.

2. The method of making tampons, which comprises the steps of successively cutting from the end of a web of body material sections of predetermined width, forming a continuous tubular jacket about said sections by feeding said sections continuously in an endwise direction to mechanism for forming such a jacket, unfilled jacket tubing being formed intermediate the successive sections and serving to connect said sections, applying pulling force to the connected sections issuing from the jacket forming mechanism to thereby withdraw the jacket tubing from said mechanism and to propel said sections through said mechanism, then, while continuing the travel of the connected sections, applying binding material to the jacket tubing intermediate successive sections and severing the jacket tubing intermediate said sections in the zones of said binding material to provide relatively independent tampon units, the binding material serving to prevent unraveling of the cut ends of said jacket tubing.

3. The method of making tampons, which comprises the steps of successively cutting from the end of a web of body material sections of predetermined width, forming a continuous tubular jacket about said sections by feeding said sections continuously in an endwise direction to mechanism for forming such a jacket, unfilled jacket tubing being formed intermediate the successive sections and serving to connect said sections, applying pulling force to the connected sections issuing from the jacket forming mechanism to thereby withdraw the jacket tubing from said mechanism and to propel said sections through said mechanism, then, while continuing the travel of the connected sections, applying binding material to the jacket tubing intermediate successive sections, subjecting the applied binding material to a drying agent, and then severing the jacket tubing intermediate said sections in the zones of said binding material to provide relatively independent tampon units, the binding material serving to prevent unraveling of the cut ends of said jacket tubing.

4. Tampon making apparatus, comprising means for feeding a strip of tampon body material, cutting mechanism for severing from the end of said strip, sections of predetermined size, and means for fluffing said strip so as to increase its thickness before said sections are severed therefrom, thereby to impart to said sections a thickness which is greater than the initial thickness of the strip from which the sections are cut, said last mentioned means comprising a pivotally mounted plate, and means for rocking said plate on its pivot mounting, said strip being guided through a path of travel adjacent the path of movement of said pivoted plate and having one side exposed to the air forced toward the web upon movement of said plate toward the web.

5. Tampon making apparatus, comprising means for successively severing sections from the end of a strip of tampon body material to thereby form tampon body sections, means for successively receiving said body sections, and means for propelling said sections comprising a conveyor, means for driving said conveyor in the direction in which said sections are to be propelled, said conveyor being also mounted for movement into and out of driving engagement with the successive cut-off sections transversely of the direction in which said sections are propelled, and means for so moving said conveyor.

6. Tampon making apparatus, comprising means for successively severing sections from the end of a web of tampon body material to thereby form tampon body sections, means for feeding said web of material in an endwise direction to said severing means, means for successively receiving said body sections and propelling the same transversely of the direction in which said web is fed, said receiving and propelling means comprising a conveyor, means for driving said conveyor in the direction in which said sections are to be propelled, said conveyor being also mounted for movement into and out of driving engagement with the successive cut-off sections transversely of the direction in which said sections are propelled, and means for so moving said conveyor.

7. In tampon making apparatus, the combination of means for feeding a web of material in an endwise direction, means for successively cutting end sections of said web from the web to form tampon body sections, a conveyor belt for successively receiving said sections and arranged to propel the same in a direction transverse to the direction of feed of said web, a second conveyor belt overlying said receiving belt and adapted to cooperate with said receiving belt to propel said body sections, said cooperating belt being mounted for movement toward and from said receiving belt, means for so moving said cooperating belt, said body sections being deliverable to said receiving belt when said cooperating belt is moved away from the receiving belt, and means for driving said belts at like speeds of travel but in opposite directions.

8. In tampon making apparatus, the combination of means for feeding a web of material in an endwise direction, cutting means for successively severing end sections from said web to thereby form tampon body sections, upper and lower conveyor belts adapted to receive between them said sections, said belts being arranged to feed said sections in a direction which extends transversely in the direction of feed of said web, one of said belts being pivotally mounted adjacent one end for rocking movement toward and from the other of said belts, means for effecting such rocking movement of said pivoted belt in timed relation with the delivery of said cut-off web sections so as to cause the cut-off sections to be delivered between said belts when said pivoted belt is moved away from the other of said belts, and means for driving said belts in opposite directions but at substantially the same speed, thereby to cause said belts to cooperate to advance said cut-off sections.

9. In tampon making apparatus, the combination of means for feeding a web of material in an endwise direction, cutting means for successively severing end sections from said web to thereby form tampon body sections, upper and lower conveyor belts adapted to receive between them said sections, said belts being arranged to feed said sections in a direction which extends transversely of the direction of feed of said web, one of said belts being pivotally mounted adjacent one end for rocking movement toward and from the other of said belts, means for effecting such rocking movement of said pivoted belt in timed relation with the delivery of said cut-off web sections so as to cause the cut-off sections to be delivered between said belts when said pivoted belt is moved away from the other of said belts, a third belt overlying a portion of said receiving belt substantially in continuation of the position of said movably mounted belt, said third belt being adapted to cooperate with said receiving belt to continue the travel of said sections upon discharge of said sections from between said receiving and cooperating belts, and means receiving said body sections from said receiving and third belts and operative to form a tubular jacket around said sections.

10. In tampon making apparatus of the class described, the combination of means for propelling a series of tampon bodies which are enclosed in and interconnected by a continuous tubular jacketing member, means for receiving said connected series of tampon bodies from said propelling means and continuing the travel thereof, said receiving means being provided with holders respectively adapted to embrace the jacket enclosed sections, and means operative while maintaining the travel of said receiving means, to adjust the position of said holders with reference to the position of said tampon sections delivered by said feeding means so as to insure registry of said holders and tampon bodies.

11. In tampon making apparatus, the combination of means for feeding a series of spaced tampon bodies enclosed in and interconnected by a tubular jacket element, a rotatable drum-like member provided with holders spaced circumferentially about said drum for receiving the successive tampon bodies from said feeding means, means for driving said drum and said feeding means in such synchronized relation as to normally effect delivery of said tampon body sections successively to said holders, and means operative while maintaining the rotation of said drum and holders for effecting rotary adjustment thereof to adjust the registry of said holders and tampon bodies.

12. Mechanism for applying an adhesive binder to the tubular jacket material of a series of spaced tampon bodies which are enclosed in and interconnected by a tubular jacket and which interconnected series of tampon bodies is propelled endwise, said means comprising upper and lower rotary arms, one of said arms having a passageway therethrough communicating with an end of the arm for delivering said binder material to the end of the arm, the other of said arms being provided with means for guiding said jacket material into engagement with the end of said arm to which said binder is delivered to thereby cause said binder material to be applied to said jacket.

13. Tampon making apparatus, comprising a rotary drum provided on its periphery with a series of circumferentially spaced holders, means for effecting rotation of said drum and holders, means for delivering into said holders successive tampon bodies enclosed within and interconnected by a continuous tubular jacket of pervious material, and means for applying adhesive binding material to portions of said tubular jacket intermediate successive tampon bodies while the latter are held by said holder, said binder applying means comprising a pair of rotating arms having cooperating ends adapted to engage and press between them said portions of the jacket material, one of said arms being provided with a passageway communicating with the end of said arm which cooperates with the end of the other arm, and means for delivering binder fluid into said passageway and to said end of the arm.

14. Tampon making apparatus, comprising a rotary drum provided on its periphery with a series of circumferentially spaced holders, means for effecting rotation of said drum and holders, means for delivering into said holders successive tampon bodies enclosed within and interconnected by a continuous tubular jacket of pervious material, and means for applying adhesive binding material to portions of said tubular jacket intermediate successive tampon bodies while the latter are held by said holder, said binder applying means comprising a pair of rotating arms having cooperating ends adapted to engage and press between them said portions of the jacket material, one of said arms being provided with a passageway communicating with the end of said arm which cooperates with the end of the other arm, means for delivering binder fluid into said passageway and to said end of the arm, and a pair of rotary cutter arms cooperating to sever said jacket in the zones to which the said binder is applied, thereby to cut said series of tampon bodies into independent tampon units.

15. Tampon making apparatus, comprising a rotary drum provided on its periphery with a series of circumferentially spaced holders, means for effecting rotation of said drum and holders, means for delivering into said holders successive tampon bodies enclosed within and interconnected by a continuous tubular jacket of pervious material, and means for applying adhesive binding material to portions of said tubular jacket intermediate successive tampon bodies while the latter are held by said holder, said binder applying means comprising a pair of rotating arms having cooperating ends adapted to engage and press between them said portions of the jacket material, one of said arms being provided with a passageway communicating with the end of said arm which cooperates with the end of the other arm, means for delivering binder fluid into said passageway and to said end of the arm, means for effecting drying of said binder, and a pair of rotary cutter arms cooperating to sever said jacket in the zone to which the said binder is applied, thereby to cut said series of tampon bodies into independent tampon units.

16. Apparatus, according to claim 15, wherein the drying means comprises a nozzle for directing a stream of drying air against the binder carrying portion of said tubular jacket material, said nozzle being mounted in said drum so as to travel therewith and so as to maintain said flow of air to said binder carrying zones during the travel thereof with said drum, and valve means for automatically starting and stopping the flow of air through said nozzle so as to limit said flow to a predetermined portion of the travel of said nozzle.

17. In tampon making apparatus of the class described, the combination of means for delivering a series of spaced tampon bodies enclosed within and interconnected by a continuous tubular jacket of pervious material, a series of holders for receiving the successive tampon bodies enclosed within said tubular jacket, means for propelling said holders, means for severing the jacket material which extends between adjacent bodies in said holders and thereby provide relatively independent tampon units, and means for ejecting the independent units so formed from said holders.

18. In tampon making apparatus of the class described, the combination of means for delivering a series of spaced tampon bodies enclosed within and interconnected by a continuous tubular jacket of pervious material, a series of holders for receiving the successive tampon bodies enclosed within said tubular jacket, means for propelling said holders, means for severing the jacket material which extends between adjacent bodies in said holders and thereby provide relatively independent tampon units, and means operative as an incident to the travel of said holders for ejecting from said holders the independent units so formed.

19. Apparatus for making tampon bodies, comprising means for delivering a series of spaced tampon bodies enclosed in and interconnected by a tubular jacket of pervious material, a rotating drum provided on its periphery with a series of holders for respectively receiving the jacket enclosed tampon bodies with portions of said jacket suspended between said holders, means for effecting spot application of binder liquid on said suspended jacket material nearer to one of said holders than to the other, means for severing said jacket material in the zone of said binder liquid to thereby provide independent tampon units having relatively long and short tubular jacket portions projecting from the opposite ends of the jacketed tampon bodies, and means for ejecting said independent tampon bodies from said holders.

20. Apparatus, according to claim 19, wherein the ejecting means comprises a pivotally mounted ejector arm normally disposed in said holder inwardly of the tampon body carried by the holder, and cam means operative at a predetermined position of each holder for rocking said ejector arm to discharge the tampon unit from the holder.

21. Apparatus, according to claim 19, wherein the tampon ejecting means comprises an arm normally disposed in said holder inwardly of the tampon unit carried thereby, said arm being pivoted adjacent one end so as to be adapted to be rocked outwardly of the holder to discharge the tampon unit, a rotary cam carried by said drum, gear and rack means for effecting rotation of said cam as an incident to the travel of said drum, and pivoted lever and link means carried by said drum, actuated by said cam and connected to said pivoted arm for actuating the latter.

22. Apparatus for making tampons comprising means for delivering a series of spaced tampon bodies enclosed in a tubular jacket of pervious material, the bodies being spaced longitudinally of said jacket, a plurality of relatively fixed holders for receiving and holding said series of jacket-enclosed bodies, severing mechanism for cutting said jacket intermediate adjacent bodies, and mechanism movable relative to said holders for engaging a severed jacket portion, spreading the end portion of the body from which said severed jacket portion extends, and tucking such jacket portion into the body between the separated portions thereof.

23. Apparatus for making tampons comprising means for delivering a series of tampon bodies enclosed in and spaced longitudinally of a tubular jacket of pervious material, a plurality of relatively fixed movable holders for receiving and holding the jacket-enclosed bodies so as to suspend the intervening jacket material, means for effecting travel of said holders, and means operative during the travel of said holders for severing said suspended jacket material, gripping the severed jacket material extending from an end of one of the held bodies, separating the adjacent end portion of such body, and depositing the gripped jacket portion between the separated portions of the body so as to cause said jacket portion to be enclosed in said body upon closing of said separated portions.

24. Apparatus for making tampons, comprising means for delivering a series of tampon bodies enclosed in and spaced longitudinally of a tubular jacket of pervious material, a plurality of relatively fixed holders for receiving and holding the jack-enclosed bodies so as to suspend the jacket material extending between such bodies, cutting mechanism acting on the suspended jacket material to sever the same intermediate adjacent bodies, a pair of grippers which are movable toward each other to grip between them the severed jacket portion extending from an end of one of said bodies, movable toward and into the adjacent end portion of said body so as to thereby carry the gripped jacket material into said body, movable away from each other and out of said body so as to release said jacket material and leave the same within the body, and means for imparting said movements of said grippers.

25. Apparatus for making tampons comprising means for delivering a series of tampon bodies enclosed in and spaced longitudinally of a tubular jacket of pervious material, a plurality of relatively fixed holders for receiving and holding the jacket-enclosed bodies so as to suspend the jacket material extending between such bodies, cutting mechanism acting on the suspended jacket material to sever the same intermediate adjacent bodies, a pair of grippers which are movable toward each other to grip between them the severed jacket portion extending from an end of one of said bodies, means for effecting movement of said grippers toward and into the adjacent end portion of said body so as to thereby carry the gripped jacket material into said body, and separation and retraction of said grippers so as to release said material and leave the same within said body, and a tucker movable between said grippers to strip said gripped material from said grippers and press the same into said body.

26. Apparatus for making tampons comprising means for delivering a series of spaced tampon bodies enclosed in and spaced longitudinally of a tubular jacket of pervious material, a plurality of holders for receiving and holding the jacket-enclosed tampon bodies in said spaced relation so as to suspend the intervening jacket material between said holders, means for severing the jacket material between adjacent holders nearer to the end of the tampon body in one of said adjacent holders than to the adjacent end of the body in the other of said adjacent holders, thereby to provide one of said bodies with a long jacket extension and the other with a short jacket extension, a pair of grippers movable towards each other for gripping the shorter of said jacket extensions, means for effecting movement of said grippers toward and into the end portion of the body from which said shorter extension projects and thereafter effecting separation and retraction of said grippers so as to release said jacket extension within said body, and a member movable into engagement with said extension upon separation and retraction of said grippers to prevent said extension from following said grippers out of said body.

27. In tampon making apparatus, the combination of means for feeding a web of material in an endwise direction, means for successively cutting end sections of said web from the web to form tampon body sections, a conveyor belt for successively receiving and propelling said sections, a second conveyor belt overlying said receiving belt and adapted to cooperate with said receiving belt to propel said body sections, said cooperating belt being mounted for movement toward and from said receiving belt, means for so moving said cooperating belt, said body sections being deliverable to said receiving belt when said cooperating belt is moved away from the receiving belt, and means for driving said belts at like speeds of travel but in opposite directions.

28. In tampon making apparatus, the combination of means for feeding a web of material in an endwise direction, means for successively cutting end sections of said web from the web to form tampon body sections, a conveyor belt for successively receiving said sections, a second conveyor belt overlying said receiving belt and adapted to cooperate with said receiving belt to propel said body sections, said cooperating belt being pivotally mounted adjacent one end for rocking movement toward and from said receiving belt, means for effecting such rocking movement of said pivoted belt in timed relation with the delivery of said cut off web sections to said receiving belt so as to cause the cut off sections to be delivered between said belts when said pivoted belt is rocked away from said receiving belt, and means for driving said belts at like speeds of travel.

29. In tampon making apparatus, the combination of means for feeding a web of material in an endwise direction, means for successively cutting end sections of said web from the web to form tampon body sections, a conveyor belt for successively receiving said sections, a second conveyor belt overlying a portion of said receiving belt and adapted to cooperate with said receiving belt to propel said body sections, said cooperating belt being pivotally mounted adjacent one end for rocking movement toward and from said receiving belt, means for effecting such rocking movement of said pivoted belt in timed relation with the delivery of said cut off web sections to said receiving belt so as to cause the cut off sections to be delivered between said belts when said pivoted belt is rocked away from said receiving belt, a third belt overlying another portion of said receiving belt substantially in continuation of said pivotally mounted belt, said third belt being adapted to cooperate with said receiving belt to continue the travel of said sections upon discharge thereof from between said receiving and pivotally mounted belts, and means receiving said body sections from said receiving and third belts and operative to jacket said sections.

30. The method of forming tampons which comprises the steps of feeding an integrated absorbent web of fibers in an endwise direction, subjecting the web to a fluffing operation so as to rearrange the fibers to thereby increase the thickness of the web while maintaining the integrated form thereof, successively severing end portions from the fluffed web to form independent tampon bodies, feeding said bodies in spaced succession and forming an open mesh jacket around each of the said bodies, and thereafter converting the jacketed bodies into compacted tampons.

31. Tampon making apparatus, comprising means for feeding a web formed of integrated fibrous material, means for fluffing said web and rearranging the fibers while maintaining the initial integrity of the web so as to increase the thickness thereof, cutting mechanism for severing from said thickened web, tampon body sections of predetermined size, means for feeding said bodies along a predetermined path, and means for forming an open mesh jacket around said bodies, the size of said jacket being determined in part by the cross sectional size of said bodies including the dimension which corresponds to the increased thickness of said web, said jacketed bodies being adapted to be compressed to provide compacted tampons which, upon wetting, are reexpandible to the extent permitted by said jacket.

References Cited in the file of this patent

UNITED STATES PATENTS

| Number | Name | Date |
|--------|------|------|
| 511,749 | Bohle | Jan. 2, 1894 |
| 1,408,586 | Green | Mar. 7, 1922 |
| 2,055,412 | Hurst et al. | Sept. 22, 1936 |
| 2,094,086 | Webb | Sept. 28, 1937 |
| 2,292,231 | Lesavoy | Aug. 4, 1942 |
| 2,296,931 | Joa | Sept. 29, 1942 |
| 2,336,744 | Manning | Dec. 14, 1943 |
| 2,385,873 | Melton | Oct. 2, 1945 |
| 2,566,190 | Greiner et al. | Aug. 28, 1951 |